United States Patent
Kumar et al.

(10) Patent No.: US 10,931,793 B2
(45) Date of Patent: Feb. 23, 2021

(54) SYSTEM AND METHOD FOR AUTOMATED RENDERING OF SERVICE CHAINING

(71) Applicant: CISCO TECHNOLOGY, INC., San Jose, CA (US)

(72) Inventors: Surendra M. Kumar, San Ramon, CA (US); Jeffrey Napper, CL Delft (NL); Prashant Patadayya Hiremath, San Jose, CA (US); Vandana Saha, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 407 days.

(21) Appl. No.: 15/347,349

(22) Filed: Nov. 9, 2016

(65) Prior Publication Data

US 2017/0310611 A1 Oct. 26, 2017

Related U.S. Application Data

(60) Provisional application No. 62/327,955, filed on Apr. 26, 2016.

(51) Int. Cl.
*H04L 29/06* (2006.01)
*H04L 29/08* (2006.01)

(52) U.S. Cl.
CPC ............ *H04L 69/00* (2013.01); *H04L 67/288* (2013.01); *H04L 67/2842* (2013.01); *H04L 69/22* (2013.01)

(58) Field of Classification Search
CPC .......................... H04L 69/00; H04L 67/2842
See application file for complete search history.

(56) References Cited

U.S. PATENT DOCUMENTS 3,629,512 A 12/1971 Yuan
4,769,811 A 9/1988 Eckberg, Jr. et al.
(Continued)

FOREIGN PATENT DOCUMENTS

CN 103716123 4/2014
CN 103716137 4/2014
(Continued)

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.
(Continued)

*Primary Examiner* — Jeffrey M Rutkowski
*Assistant Examiner* — Jasper Kwoh
(74) *Attorney, Agent, or Firm* — Polsinelli PC

(57) ABSTRACT

In one embodiment, a method includes creating a catalog of service function ("SF") profiles, wherein each of the profiles is associated with an SF and indicates a type of the associated SF; storing the catalog of SF profiles in a memory device of a service controller associated with the DVS; creating a service profile group template ("SPGT") that includes at least one SF profile from the catalog of SF profiles, wherein the SPGT includes a service chain definition identifying at least one service chain comprising the SF associated with the at least one SF profile to be executed in connection with a service path and at least one policy for classifying traffic to the at least one service chain; deploying a first SPG instance based on the SPGT; and deploying an additional SPG instance based on the SPGT in accordance with a scaling policy included in the SPGT.

20 Claims, 16 Drawing Sheets

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramanian Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,258,742 B1 * | 2/2016 | Pianigiani ............ H04L 67/327 |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,647,889 B1 * | 5/2017 | Jones ..................... G06F 9/547 |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,853,898 B1 * | 12/2017 | Subramanian ........ H04L 45/745 |
| 9,882,776 B2 | 1/2018 | Aybay et al. |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |

(56) References Cited

U.S. PATENT DOCUMENTS

| | | |
|---|---|---|
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0138170 A1* | 6/2005 | Cherkasova .......... H04L 41/145 709/225 |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112141 A1* | 5/2006 | Morris .......... G06F 16/9566 |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0107712 A1* | 5/2013 | Allan .......... H04L 47/125 370/235 |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1* | 6/2013 | Bagepalli .......... H04L 49/70 370/409 |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0274408 A1* | 9/2014 | Dave .......... A63F 13/12 463/42 |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0325042 A1* | 10/2014 | Croy .......... H04L 47/70 709/221 |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0200844 A1* | 7/2015 | Zhu .......... H04L 45/507 370/392 |
| 2015/0222516 A1 | 8/2015 | Deval et al. |
| 2015/0222533 A1 | 8/2015 | Birrittella et al. |

(56) References Cited

U.S. PATENT DOCUMENTS

| | | | |
|---|---|---|---|
| 2015/0236948 | A1 | 8/2015 | Dunbar et al. |
| 2015/0249593 | A1* | 9/2015 | Alvarez .............. H04L 41/0803 370/241 |
| 2015/0319078 | A1 | 11/2015 | Lee et al. |
| 2015/0319081 | A1 | 11/2015 | Kasturi et al. |
| 2015/0326473 | A1 | 11/2015 | Dunbar et al. |
| 2015/0333930 | A1 | 11/2015 | Aysola et al. |
| 2015/0334027 | A1 | 11/2015 | Bosch et al. |
| 2015/0341285 | A1 | 11/2015 | Aysola et al. |
| 2015/0365495 | A1 | 12/2015 | Fan et al. |
| 2015/0381465 | A1 | 12/2015 | Narayanan et al. |
| 2015/0381557 | A1 | 12/2015 | Fan et al. |
| 2016/0028604 | A1 | 1/2016 | Chakrabarti et al. |
| 2016/0028640 | A1 | 1/2016 | Zhang et al. |
| 2016/0043952 | A1 | 2/2016 | Zhang et al. |
| 2016/0050117 | A1 | 2/2016 | Voellmy et al. |
| 2016/0050132 | A1 | 2/2016 | Zhang |
| 2016/0080263 | A1 | 3/2016 | Park et al. |
| 2016/0099853 | A1 | 4/2016 | Nedeltchev et al. |
| 2016/0119159 | A1 | 4/2016 | Zhao et al. |
| 2016/0119253 | A1 | 4/2016 | Kang et al. |
| 2016/0127139 | A1 | 5/2016 | Tian et al. |
| 2016/0134518 | A1 | 5/2016 | Callon et al. |
| 2016/0134535 | A1 | 5/2016 | Callon |
| 2016/0139939 | A1 | 5/2016 | Bosch et al. |
| 2016/0164776 | A1 | 6/2016 | Biancaniello |
| 2016/0165014 | A1 | 6/2016 | Nainar et al. |
| 2016/0173373 | A1 | 6/2016 | Guichard et al. |
| 2016/0173464 | A1 | 6/2016 | Wang et al. |
| 2016/0182336 | A1 | 6/2016 | Doctor et al. |
| 2016/0182342 | A1 | 6/2016 | Singaravelu et al. |
| 2016/0182684 | A1 | 6/2016 | Connor et al. |
| 2016/0212017 | A1 | 7/2016 | Li et al. |
| 2016/0226742 | A1 | 8/2016 | Apathotharanan et al. |
| 2016/0248685 | A1 | 8/2016 | Pignataro et al. |
| 2016/0277250 | A1 | 9/2016 | Maes |
| 2016/0285720 | A1 | 9/2016 | Mäenpää et al. |
| 2016/0323165 | A1 | 11/2016 | Boucadair et al. |
| 2016/0330748 | A1* | 11/2016 | Bindrim ................ H04M 15/66 |
| 2016/0352629 | A1 | 12/2016 | Wang et al. |
| 2016/0380966 | A1 | 12/2016 | Gunnalan et al. |
| 2017/0019302 | A1* | 1/2017 | Lapiotis ................ H04L 41/145 |
| 2017/0019303 | A1 | 1/2017 | Swamy et al. |
| 2017/0031804 | A1 | 2/2017 | Ciszewski et al. |
| 2017/0078175 | A1 | 3/2017 | Xu et al. |
| 2017/0187609 | A1 | 6/2017 | Lee et al. |
| 2017/0208000 | A1 | 7/2017 | Bosch et al. |
| 2017/0214627 | A1 | 7/2017 | Zhang et al. |
| 2017/0237656 | A1 | 8/2017 | Gage et al. |
| 2017/0250917 | A1 | 8/2017 | Ruckstuhl et al. |
| 2017/0272470 | A1 | 9/2017 | Gundamaraju et al. |
| 2017/0279712 | A1 | 9/2017 | Nainar et al. |
| 2017/0331741 | A1 | 11/2017 | Fedyk et al. |
| 2018/0013841 | A1 | 1/2018 | Nainar et al. |
| 2018/0026884 | A1 | 1/2018 | Nainar et al. |
| 2018/0026887 | A1 | 1/2018 | Nainar et al. |
| 2018/0041470 | A1 | 2/2018 | Schultz et al. |
| 2018/0062991 | A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "OpenNebula 4.6 User Guide," Jun. 12, 2014, opennebula.org, 87 pages.

Author Unknown, "Service-Aware Network Architecture Based on SDN, NFV, and Network Intelligence," 2014, 8 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Bremler-Barr, Anat, et al., "Deep Packet Inspection as a Service," CoNEXT '14, Dec. 2-5, 2014, pp. 271-282.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Farrel, A., et al., "A Path Computation Element (PCE)—Based Architecture," RFC 4655, Network Working Group, Aug. 2006, 40 pages.

Jiang, Y., et al., "An Architecture of Service Function Chaining," IETF Network Working Group Internet Draft, draft-jiang-sfc-arch-01.txt, Feb. 14, 2014; 12 pages.

Katsikas, Goergios P., et al., "Profiling and accelerating commodity NFV service chains with SCC," The Journal of Systems and Software, vol. 127, Jan. 2017, pp. 12-27.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

Quinn, P., et al., "Network Service Header," Network Working Group, Mar. 24, 2015, 42 pages; https://tools.ietf.org/pdf/draft-ietf-sfc-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Service Function Chaining: Creating a Service Plane via Network Service Headers," IEEE Computer Society, 2014, pp. 38-44.

Zhang, Ying, et al. "StEERING: A Software-Defined Networking for Inline Service Chaining," IEEE, 2013, IEEE, p. 10 pages.

Aldrin, S., et al. "Service Function Chaining Operation, Administration and Maintenance Framework," Internet Engineering Task Force, Oct. 26, 2014, 13 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

(56) References Cited

OTHER PUBLICATIONS

Author Unknown, "Cloud-Native VNF Modelling," Open Source Mano, © ETSI 2016, 18 pages.
Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.
Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.
Author Unknown, "GStreamer and in-band metadata," from RidgeRun Developer Connection, Jun. 19, 2012, 5 pages https://developersidgerun.conn/wiki/index.php/Gstreanner_and_in-band_nnetadata.
Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.
Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.
Author Unknown, "Network Functions Virtualisation (NFV); Use Cases," ETSI, GS NFV 001 v1.1.1, Architectural Framework, © European Telecommunications Standards Institute, Oct. 2013, 50 pages.
Author Unknown, "Understanding Azure, a Guide for Developers," Microsoft Corporation, Copyright © 2016 Microsoft Corporation, 39 pages.
Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Baird, Andrew, et al. "AWS Serverless Multi-Tier Architectures; Using Amazon API Gateway and AWS Lambda," Amazon Web Services Inc., Nov. 2015, 20 pages.
Boucadair, Mohamed, et al., "Differentiated Service Function Chaining Framework," Network Working Group Internet Draft draft-boucadair-network-function-chaining-03, Aug. 21, 2013, 21 pages.
Cisco Systems, Inc. "Cisco NSH Service Chaining Configuration Guide," Jul. 28, 2017, 11 pages.
Ersue, Mehmet, "ETSI NFV Management and Orchestration—An Overview," Presentation at the IETF# 88 Meeting, Nov. 3, 2013, 14 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.
Jiang, Yuanlong, et al., "Fault Management in Service Function Chaining," Network Working Group, China Telecom, Oct. 16, 2015, 13 pages.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-alike/.

\* cited by examiner

SYSTEM AND METHOD FOR AUTOMATED RENDERING OF SERVICE CHAINING

CROSS-REFERENCE TO RELATED APPLICATION

This application claims the benefit of priority under 35 U.S.C. § 119(e) to U.S. Provisional Application Ser. No. 62/327,955, entitled "SYSTEM AND METHOD FOR AUTOMATED RENDERING OF SERVICE CHAINING," filed Apr. 26, 2016.

TECHNICAL FIELD

This disclosure relates in general to the field of computer networking, and more particularly, though not exclusively to, a system and method for automated rendering of service chaining.

BACKGROUND

In an example contemporary computer architecture, functions such as firewalls, deep packet inspection ("DPI"), antivirus, load balancing, and network address translation ("NAT") to name just a few, may be provided via network function virtualization ("NFV"). In NFV, each network node may be virtualized into a single-function virtual machine ("VM"), and several such single-function VMs may be provided on a single physical computer node, such as a rack-mount or blade server. Instances of virtual network functions ("VNFs") may be "spun up" as needed to meet demand, and then "spun down" when demand decreases.

The path that a packet follows as it traverses the virtual network may be referred to as a "service function chain" ("SFC"). For example, if a packet is to be first inspected by a firewall ("FW"), then by a DPI, and finally sent to a NAT, before finally being forwarded to the workload ("WL") server, the service chain (starting from an edge router ("ER")) may include ER→FW→DPI→NAT→WL.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

DETAILED DESCRIPTION OF EXAMPLE EMBODIMENTS

Overview

Figure 1:
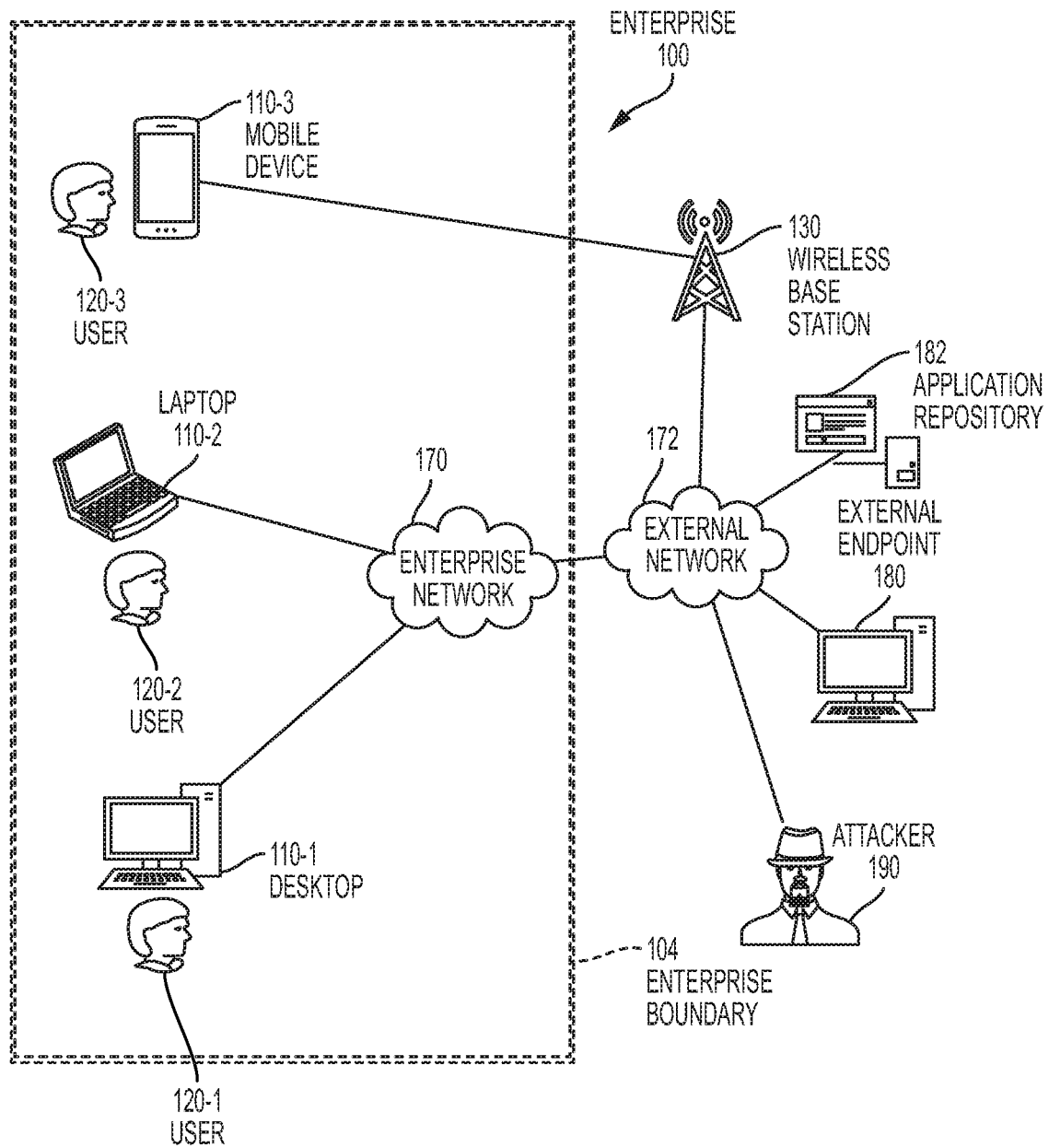
FIG. 1 is a block diagram of a network architecture according to one or more examples of embodiments described herein.

In one embodiment, a method includes creating a catalog of service function ("SF") profiles for use in a network comprising a distributed virtual switch ("DVS"), wherein each of the profiles is associated with an SF and indicates a type of the associated SF; storing the catalog of SF profiles in a memory device of a service controller associated with the DVS; creating a service profile group template ("SPGT") that includes at least one SF profile from the catalog of SF profiles, wherein the SPGT includes a service chain definition identifying at least one service chain comprising the SF associated with the at least one SF profile to be executed in connection with a service path and at least one policy for classifying traffic to the at least one service chain; deploying a first SPG instance based on the SPGT; and deploying an additional SPG instance based on the SPGT in accordance with a scaling policy included in the SPGT.

Example Embodiments

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

To accommodate agile networking and flexible provisioning of network nodes in a network, service chaining may be used to ensure an ordered set of service functions are applied to packets and/or frames of a traffic flow. Service chaining provides a method for deploying service functions in a manner that enables dynamic ordering and topological independence of the service functions. A service chain may define an ordered set of service functions to be applied to packets and/or frames of a traffic flow, where each service function of the ordered set is selected as a result of classification. The implied order may not be a linear progression, as the architecture may allow for nodes that copy to more than one branch.

In an example service function chain ("SFC"), a set of service functions ("SF") may be applied in a linear or sequential fashion. For example, from a classifier at an ER to an egress interface at a WL server, the path may include Classifier→SF1→SF2→SF3→SF4→Egress. Some service functions are required, in certain embodiments, to be applied in a particular manner. For example, in some embodiments, NAT must be applied after DPI to avoid assigning an address to a flow that will end up being marked as "Spam" and dropped by the DPI. But in other embodiments, it is practical to apply certain service functions in parallel.

For example, a non-reactive service function ("NRSF") includes any function that does not, or in the context of the specific network, cannot, modify a packet. NRSFs may include, for example, traffic monitoring functions, accounting or billing functions, transparent cache functions, and lawful intercept functions by way of nonlimiting example. In some cases, NRSFs may include "testbed" SFs that are intended to be reactive SFs in the future, but that are currently undergoing testing and thus should not be permitted to modify "live" flows. Rather, they may simply perform "dummy" operations on duplicate flows and log the results so that the function can be evaluated. Thus, while these functions may be intended to modify packets in a general sense, in the context of the specific network, they may not be permitted to modify a packet.

Service chaining involves steering user/application traffic through a list of ordered service functions (such as firewalls, DPI, NAT, Optimizers, Ad insertion, CDN, etc.) before forwarding onwards to its destination, in the process servicing the traffic as per policy. These service chains are typically heterogeneous with best of breed functions from different vendors. In the legacy data centers with physical service appliances, the deployment of service chains involved manually installing the appliances and connecting them via VLANs. There was not much scope for automation beyond application of configuration to the switches and appliances through primitive methods.

In the newer virtual datacenters with commercial off the shelf ("COTS") hardware, workload deployment is automated through virtual infrastructure managers such as OpenStack. In these datacenters, workloads in the form of virtual machines, are deployed and scaled up and down while maintaining the virtual wiring to virtual switches for connectivity. Virtual service function appliances can thus benefit from the automation that exists in such data centers. However, even in such automated virtual datacenters, existing methods of constructing service chains depend on manually connecting the virtual service functions. Service chains are constructed either through Graphical User Interface ("GUI") or Command Line Interface ("CLI") by selecting instances of service functions and specifying the order and connectivity options such as VLAN, VxLAN, etc., in essence hand crafting a service forwarding graph.

Newer service chaining techniques based on IETF SFC define the notion of service chains and service paths. Service chains are ordered list of service function "types" while service paths are the "instances" of those service chains. Although chains and paths are conceptually described, there is no prescriptive or standard method to render chains into paths and deploy them. This is an emerging area ripe for innovation given the SDN, NFV and cloud underpinnings.

Embodiments described in detail herein include a novel method of rendering service paths ("instances") from their corresponding service chains ("types") for an automated construction and deployment of service chains. The rendering is fully controlled by user policy, allowing full control of constructions and deployment. The rendered service paths allow for full automation in scaling service capacity up and down based on load. This method vastly simplifies large scale deployment of service chains as is essential in cloud environments.

As previously noted, implementation of service chaining involves a classifier function that performs classification based on policies configured by a control plane element to select a service chain to process traffic and load balances the traffic among instances of the selected service chain. Once the classifier function selects a service chain instance (a.k.a. service function path or "SFP"), it forwards the traffic along a service function path ("SFP"), or simply, a service path, through one or more service-aware forwarding elements ("FEs"). In one certain embodiment, each forwarding element implements a service function forwarder ("SFF") capability described in an IETF draft entitled "Service Function Chaining (SFC) Architecture" (IETF RFC7665—https://datatracker.ietf.org/doc/rfc7665/) (hereinafter "SFC Architecture RFC"). The forwarding elements forward the traffic to the actual service functions that are logically anchored to, and/or instantiated on, the forwarding element. Forwarding of traffic between any two components in such an architecture, and hence along the service chains, is performed over an overlay network. Overlay networks are realized via a transport header and an encapsulation header. Various network encapsulation headers have been employed to forward traffic, requiring service through the service chains. Such network encapsulation headers encapsulate the original packet, or frame, and are themselves encapsulated in an overlay transport protocol. Examples of encapsulation headers include proprietary headers, such as vPath, or proposed IETF standard headers, such as Network Service Header ("NSH"). Transport protocols used to carry such encapsulated packets may be L3- or L4-based, such as IPv4/IPv6 or GRE or UDP, VxLAN, etc. In the case of vPath, even L2-based, such as LLC SNAP.

A system and method for automated rendering of service chaining will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a networked enterprise 100 according to one or more examples of the present Specification. Enterprise 100 may be any suitable enterprise, including a business, agency, nonprofit organization, school, church, family, or personal network, by way of non-limiting example. In the example shown in FIG. 1, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each client device 110 may include an appropriate operating system, such as Microsoft Windows, Linux, Android, Mac OSX, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, along with appropriate software. In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

Networked enterprise 100 may encounter a variety of "network objects" on the network. A network object may be any object that operates on, interacts with, or is conveyed via enterprise network 170. In one example, objects may be broadly divided into hardware objects, including any physical device that communicates with or operates via the network, software objects, and other logical objects.

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, an application repository 182, an external endpoint 180, and an attacker 190. It may be a goal for enterprise 100 to provide access to desirable services, such as application repository 182 and external endpoint 180, while excluding malicious objects such as attacker 190.

In some cases, networked enterprise 100 may be configured to provide services to external endpoint 180. For example, networked enterprise 100 may provide a website that its customers access via external endpoint 180. The website may be an important means for distributing key information to users and customers. In other examples, networked enterprise 100 may provide services such as webmail, file transfer protocol (FTP), file hosting or sharing, cloud backup, or managed hosting to clients operating external endpoint 180. Thus, in some cases, enterprise network 172 provides business-critical customer-facing network services. Enterprise network 172 may also provide business-critical services to enterprise users 120, such as an intranet, file server, database server, middleware, or other enterprise services. Wireless base station 130 may provide mobile network services to one or more mobile devices 110, both within and without enterprise boundary 104. Application repository 182 may represent a Windows or Apple "App Store" or update service, a Unix-like repository or ports collection, or other network service providing users 120 the ability to interactively or automatically download and install applications, patches, or other software on client devices 110.

Figure 2:
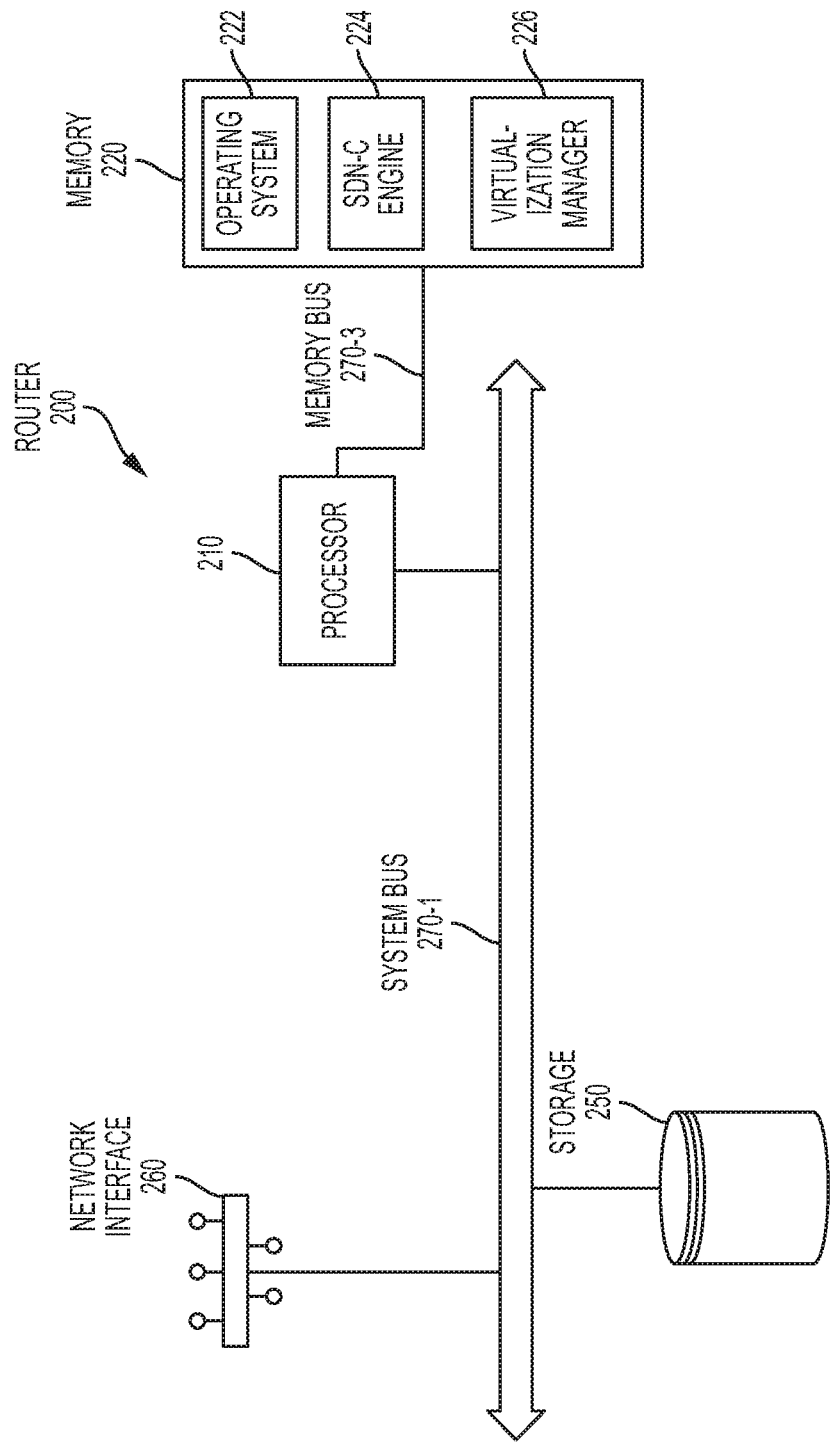
FIG. 2 is a block diagram of a computing device according to one or more examples of embodiments described herein.

FIG. 2 is a block diagram of computing device, such as a router 200, according to one or more examples of the present Specification. Router 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Router 200 is disclosed by way of nonlimiting example to illustrate a suitable hardware and software platform for providing a software-defined networking controller (SDN-C) engine 224 and/or a virtualization manager. It should be noted that SDN-C 224 and virtualization manager 226 may be provided on the same hardware platform, or on different hardware platforms, each of which may include some or all of the hardware and logical structures disclosed herein, separately or in combination. The hardware platform providing zero, one, or both of these engines may function as a router within the network, such as enterprise network 170, or may be some other kind of hardware. In a general sense, it should be understood that in a world where many network functions can be virtualized on many different kinds of platforms, many different configurations are possible, all of which would fall well within the spirit and scope of the appended claims.

In this example, router 200 includes a processor 210 connected to a memory 220, having stored therein executable instructions for providing an operating system 222 and at least software portions of a SDN-C engine 224. Other components of router 200 include a storage 250, and network interface 260. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processors may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of SDN-C engine 224. Many other configurations are also possible, and are intended to be encompassed within the broad scope of this Specification.

Network interface 260 may be provided to communicatively couple router 200 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.\

SDN-C engine 224, in one example, is operable to carry out computer-implemented methods as described in this Specification. SDN-C engine 224 may include one or more tangible non-transitory computer-readable mediums having stored thereon executable instructions operable to instruct a processor to provide an SDN-C engine 224. As used throughout this Specification, an "engine" includes any combination of one or more logic elements, of similar or dissimilar species, operable for and configured to perform one or more methods provided by the engine. Thus, SDN-C engine 224 may comprise one or more logic elements configured to provide methods as disclosed in this Specification. In some cases, SDN-C engine 224 may include a special integrated circuit designed to carry out a method or a part thereof, and may also include software instructions operable to instruct a processor to perform the method. In some cases, SDN-C engine 224 may run as a "daemon" process. A "daemon" may include any program or series of executable instructions, whether implemented in hardware, software, firmware, or any combination thereof, which runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that SDN-C engine 224 may also include other hardware and software, including configuration files, registry entries, and interactive or user-mode software by way of non-limiting example.

In one example, SDN-C engine 224 includes executable instructions stored on a non-transitory medium operable to perform a method according to this Specification. At an appropriate time, such as upon booting router 200 or upon a command from operating system 222 or a user 120, processor 210 may retrieve a copy of the instructions from storage 250 and load it into memory 220. Processor 210 may then iteratively execute the instructions of SDN-C engine 224 to provide the desired method. SDN-C engine 224 may be configured to provide service chaining, including for example the service chaining architecture disclosed herein.

In this embodiment, SDN-C engine 224 provides a service-chaining engine. Note however that the service-chaining engine is shown within SDN-C engine 224 by way of non-limiting example only. In a more general sense, the service-chaining engine may be any engine according to the present disclosure. The service-chaining engine may be configured to carry out methods according to this Specification, including for example the methods illustrated and described herein.

Further in this example, on the same, shared, or on separate hardware, a virtualization manager 226 is shown. Virtualization manager 226 may be an engine according to the present disclosure. Non-limiting examples of virtualization managers include VMware ESX (or enhancements thereof, such as vSphere), Citrix XenServer, or Microsoft Hyper-V. The foregoing are all examples of "type 1" hypervisors, but it should be noted that other types of virtualization managers may be used, including type 2 hypervisors, or other virtualization solutions.

Figure 3A:
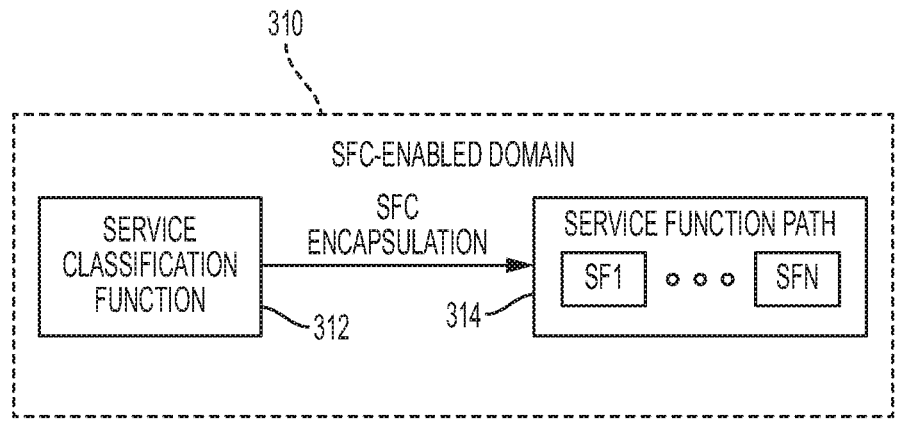
FIG. 3A is an SFC-enabled domain according to one or more examples of embodiments described herein.

Referring now to FIG. 3A, illustrated therein is an SFC-enabled domain 310, which may include an initial service classification function (or "classifier") 312, as an entry point to a service path. The initial service classification function 312 prescribes an instance of the service path, designated in FIG. 3A by a reference numeral 314, and encapsulates a packet or frame with service path information that identifies the service path. The classification function 312 may potentially add metadata, or shared context to the SFC encapsulation part of the packet or frame. The service path 314 may include a plurality of service functions, designated in FIG. 3A by SF1, SF2, . . . SFN.

A service function may be responsible for specific treatment and/or processing of received packets. A service function may act at the network layer or other OSI layers (e.g., application layer, presentation layer, session layer, transport layer, data link layer, and physical link layer). A service function may be a virtual instance or be embedded in a physical network element, such as a service node. When a service function or other modules of a service node are executed by the at least one processor of the service node, the service function or other modules may be configured to implement any one of the methods described herein. Multiple service functions can be embedded in the same network element. Multiple instances of the service function can be enabled in the same administrative SFC-enabled domain. A non-exhaustive list of service functions includes firewalls, WAN and application acceleration, Deep Packet Inspection ("DPI"), server load balancers, NAT44, NAT64, HOST_ID injection, HTTP Header Enrichment functions, TCP optimizer, and others. A service function may be SFC-encapsulation aware; that is, it may receive and act on information in the SFC encapsulation, or unaware in which case data forwarded to the service does not contain the SFC encapsulation.

A service node may be a physical network element (or a virtual element embedded on a physical network element) that hosts one or more service functions and may have one or more network locators associated with it for reachability and service delivery. In many standardization documents, "service functions" can refer to the service nodes described herein as having one or more service functions hosted thereon. SFP, or simply service path, relates to the instantiation of a service chain in a network. Packets follow a service path from a classifier through the requisite service functions.

Figure 3B:
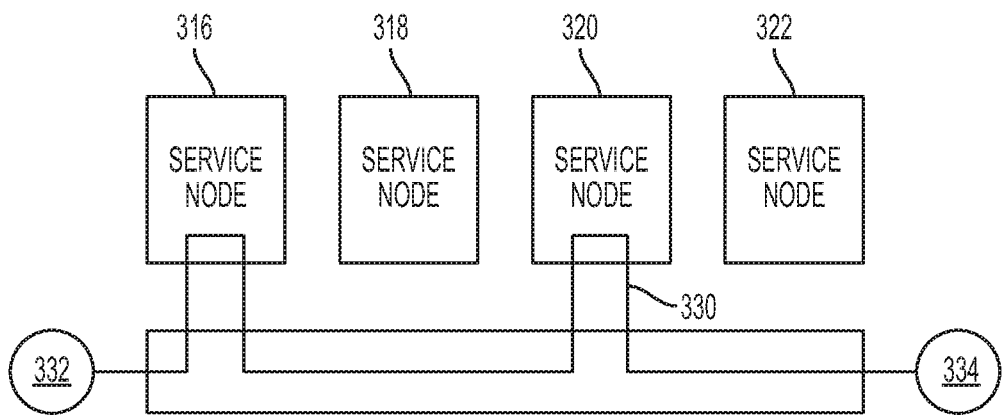
FIG. 3B illustrates a simplified block diagram of a service function chain according to one or more examples of embodiments described herein.
Figure 3C:
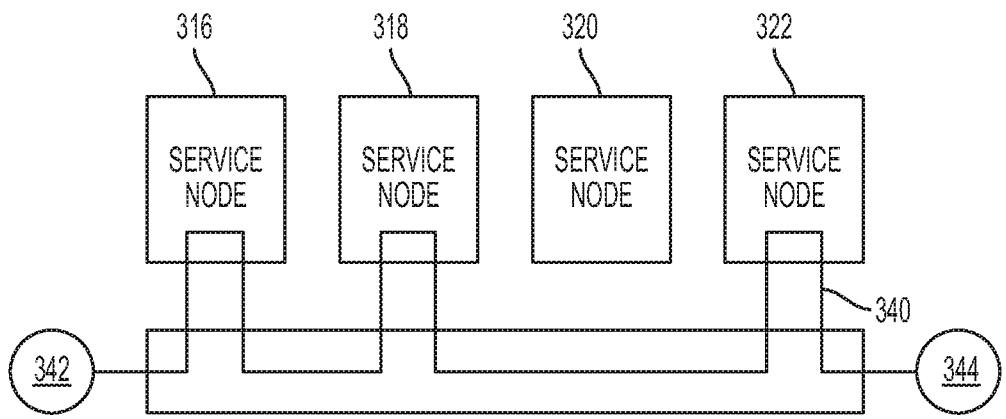
FIG. 3C illustrates a simplified block diagram of another service function chain according to one or more examples of embodiments described herein.

FIGS. 3B-3C illustrates different service paths that may be realized using service function chaining. These service paths may be implemented by encapsulating packets of a traffic flow with a network service header ("NSH") or some other suitable packet header which specifies a desired service path (e.g., by identifying a particular service path using service path information in the NSH) through one or more of service nodes 316, 318, 320, and 322. In the example shown in FIG. 3B, a service path 330 may be provided between an endpoint 332 and an endpoint 334 through service node 316 and service node 320. In the example shown in FIG. 3C, a service path 340 (a different instantiation) can be provided between end point 342 and endpoint 344 through service node 316, service node 318, and service node 322.

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier ("SCL") or some other suitable SFC-aware network element can process packets or frames of a traffic flow and performs NSH encapsulation according to a desired policy for the traffic flow.

Figure 4A:
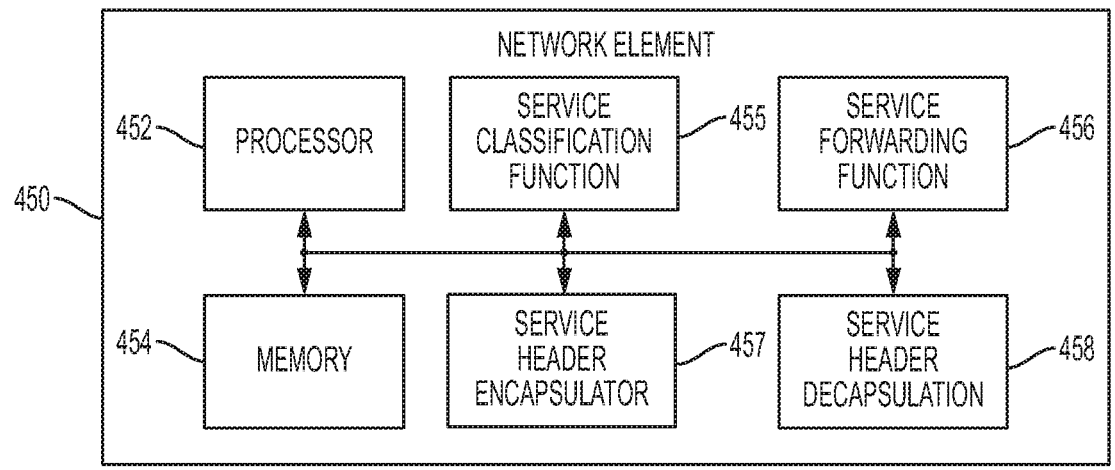
FIG. 4A is a simplified block diagram of a first type of service function chain-aware network element for prescribing a service path of a traffic flow according to one or more examples of embodiments described herein.

FIG. 4A shows a system view of SFC-aware network element 450, e.g., such as an initial service classifier, for prescribing a service path of a traffic flow, according to some embodiments of the disclosure. Network element 450 includes processor 452 and (computer-readable non-transitory) memory 454 for storing data and instructions. Furthermore, network element 450 may include a service classification function 455, a service forwarding function 456, a service header encapsulator 457, and a service header decapsulator 458, all of which may be provided by processor 452 when processor 452 executes the instructions stored in memory 454. Service forwarding function 455 determines how to forward service encapsulated packets at a classifier or a forwarding network element. It also determines whether to remove or modify the service encapsulation header received. The latter is true if the network element is acting as a service forwarder as opposed to a classifier. In general, a classifier needs a service forwarding function alongside it, whereas a service forwarding function does not necessarily need a classifier.

The service classification function 455 can process a packet of a traffic flow and determine whether the packet requires servicing and correspondingly which service path to follow to apply the appropriate service. The determination can be performed based on business policies and/or rules stored in memory 454. Once the determination of the service path is made, service header encapsulator 457 generates an appropriate NSH having identification information for the service path and adds the NSH to the packet. The service header encapsulator 457 provides an outer encapsulation to forward the packet to the start of the service path. Other SFC-aware network elements are thus able to process the NSH while other non-SFC-aware network elements would simply forward the encapsulated packets as is. Besides inserting an NSH, network element 450 can also remove or not add the NSH if the service classification function 455 determines the packet does not require servicing.

Figure 4B:
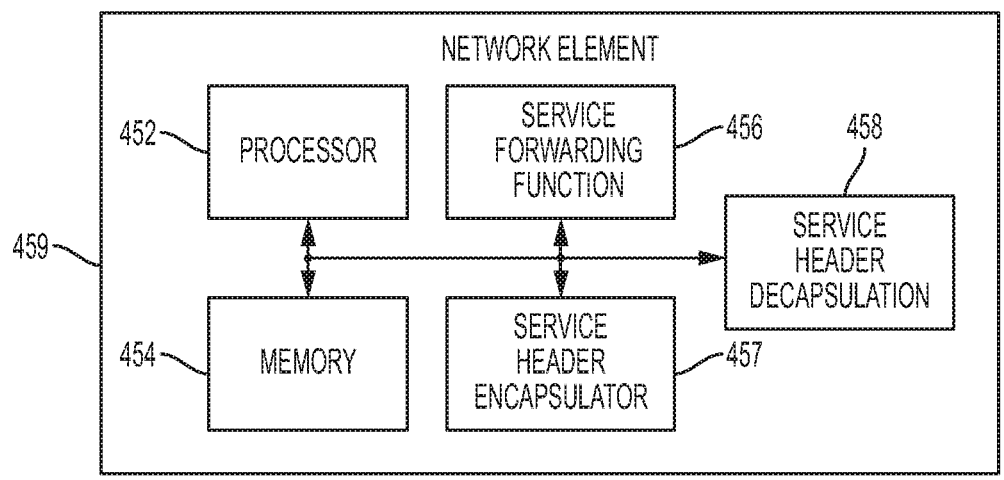
FIG. 4B is a simplified block diagram of a second type of service chain function-aware network element for forwarding a traffic flow according to one or more examples of embodiments described herein.

FIG. 4B shows a system view of an SFC-aware network element 458, e.g., such as an SFF, for forwarding service flows to service functions and to other SFFs as prescribed, according to some embodiments of the disclosure. Network element 458 is identical in all respects to network element 450 except that network element 458 does not include service classification function 455.

An NSH may include a (e.g., 64-bit) base header, and one or more context headers. Generally speaking, the base header provides information about the service header and service path identification (e.g., an SPI), and context headers may carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location (i.e., service function) within a path. The variable length context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can, for instance, derive policy selection from the NSH. Context headers shared in the NSH can, for instance, provide a range of service-relevant information such as traffic classification, end point identification, etc. Service functions can use NSH to select local service policy.

Figure 5:
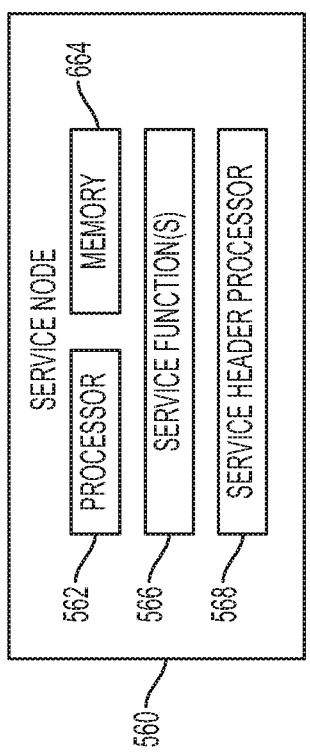
FIG. 5 is a simplified block diagram of a service node according to one or more examples of embodiments described herein.

Once properly classified and encapsulated by the classifier, the packet having the NSH may be then forwarded to one or more service nodes where service(s) can be applied to the packet/frame. FIG. 5 shows a system view of a service node, according to some embodiments of the disclosure. Service node 560, generally a network element, can include processor 562 and (computer-readable non-transitory) memory 564 for storing data and instructions. Furthermore, service node 560 may include service function(s) 566 (e.g., for applying service(s) to the packet/frame, classifying the packet/frame) and service header processor 568. The service functions(s) 566 and service header processor 568 can be provided by processor 562 when processor 562 executes the instructions stored in memory 564. Service header processor 568 can extract the NSH, and in some cases, update the NSH as needed. For instance, the service header processor 568 can decrement the service index. If the resulting service index=0, the packet is dropped. In another instance, the service header processor 568 or some other suitable module provided by the service node can update context header fields if new/updated context is available.

As previously noted, service chaining involves a classifier function performing classification based on policies configured by a control plane to select service chains and perform load balancing among instances of the service chains. The classifier function then forwards the traffic along the SFP through one or more service-aware forwarding elements. Forwarding elements implement a service function forwarder ("SFF") capability described in the aforementioned SFC Architecture IETF Draft. The forwarding elements forward the traffic to the actual service chain nodes that are logically anchored to the forwarding element. Forwarding of traffic between any two components in such an architecture, and hence through the service chains, is performed over an overlay network. As previously noted, overlay networks are realized via a transport header and an encapsulation header. Various network encapsulation headers have been employed to forward traffic, requiring service through the service chains. Such headers encapsulate the original packet, or frame, and are themselves encapsulated in an overlay transport protocol. Examples of encapsulation headers include proprietary headers such as vPath or proposed IETF standard headers, such as Network Service Header ("NSH"). The transport protocols used to carry such encapsulations are typically L3 or L4 based, such as IPv4/IPv6 or GRE or UDP, VxLAN, etc. In the case of vPath, even L2 protocols, such as LLC SNAP, may be used.

By way of an example, a service chain $SC_1$ may be described in terms of service function ("SF") types:

$$SC_1 = SF_a, SF_b, SF_c$$

Corresponding service chain instances, i.e., the service paths ("SPs"), may be constructed from instances of the service function type:

$$SP_{1.1} = SF_{a1}, SF_{b1}, SF_{c1}$$

$$SP_{1.2} = SF_{a1}, SF_{b3}, SF_{c2}$$

Figure 6:
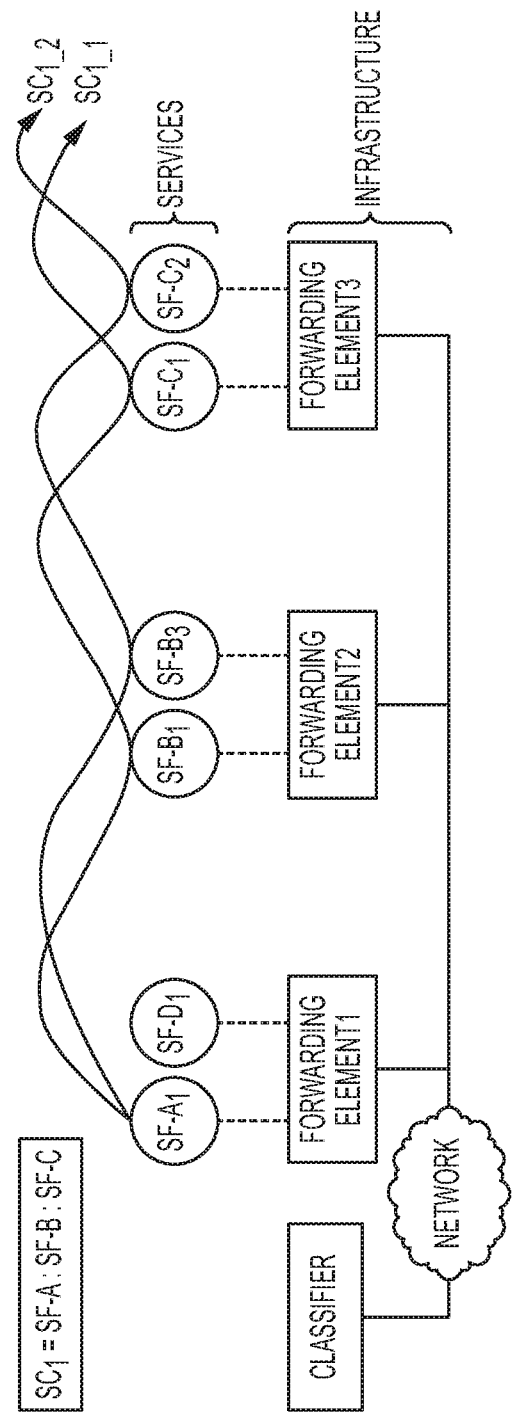
FIG. 6 illustrates two example service paths according to one or more examples of embodiments described herein.
Figure 7A:
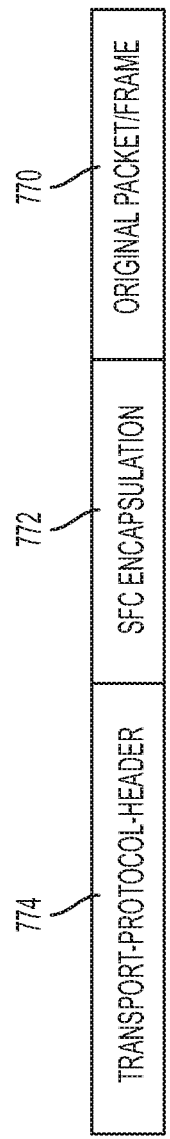
FIG. 7A illustrates an example packet structure according to one or more examples of embodiments described herein.

As illustrated in FIG. 6, service chain SC1 maps to two service paths SP1.1 and SP1.2. Classifier selects the service chain SC1 and load balances between instances SP1.1 and SP1.2. In general, packets forwarded between the components, such as, between classifier and forwarding element or forwarding element and service function, is of the form illustrated in FIG. 7A and include an original packet/frame 770, SFC encapsulation 772, and a transport protocol header 774. The SFC encapsulation 772 may be implemented using an NSH. As previously noted, NSH includes a base header, a service header, and a fixed/variable number of metadata TLVs as described in IETF draft entitled "Network Service Header" (draft-ietf-sfc-nsh-01.txt) (hereinafter "NSH IETF Draft").

Figure 7B:
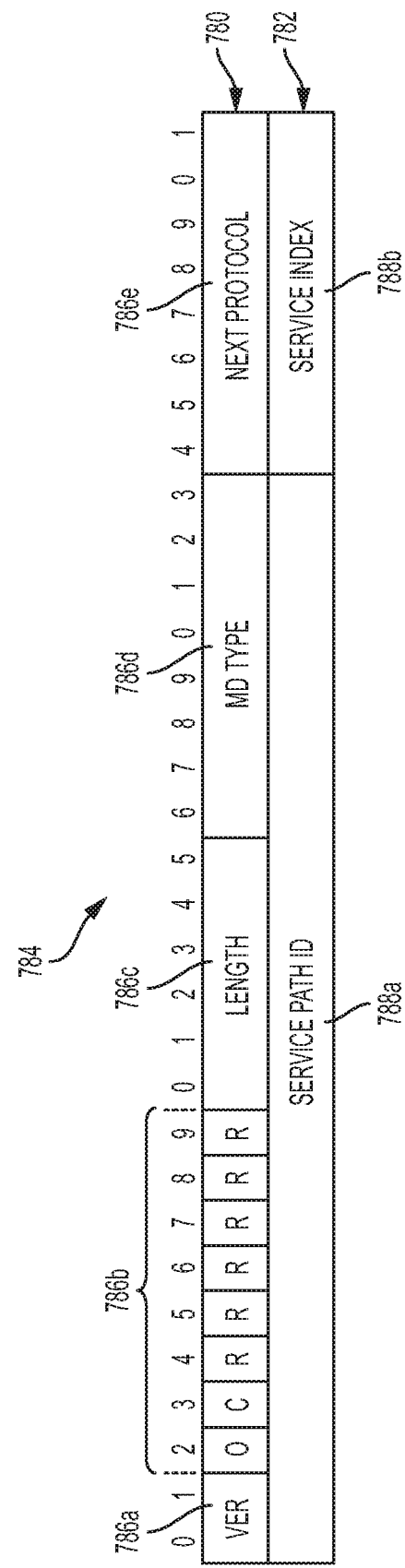
FIG. 7B illustrates an example arrangement of base and service headers according to one or more examples of embodiments described herein.

FIG. 7B shows the format of a base header 780 and a service header 782 of a conventional NSH 784. As shown in FIG. 7B, the base header 780 includes a version field 786*a*, a number of individual bits/flags, collectively designated by a reference numeral 786*b*, a length field 86*c*, a metadata type field 786*d*, and a next protocol field 786*e*. The services header 782 includes a Service Path ID field 788*a* and a Service Index field 788*b*. The fields and their contents are described in detail in the aforementioned NSH IETF Draft. In some cases, NSH requires that the Service Index ("SI") must be decremented by the service functions. Also, in some cases, NSH requires that the FEs must forward NSH encapsulated traffic based Service Path ID ("SPI") and Service Index ("SI"), as received from other components. As described above, both the SPI and the SI, which are included in the service header of an NSH, are needed to make a forwarding decision. The control plane constructs the SPIs and distributes them into the forwarding elements along with SI and decrement value (i.e., the amount by which to decrement the SI). This implies that all service functions must have the knowledge of the SPIs and the SIs and in turn manipulate them prior to forwarding a NSH encapsulated packet out.

Figure 8A:
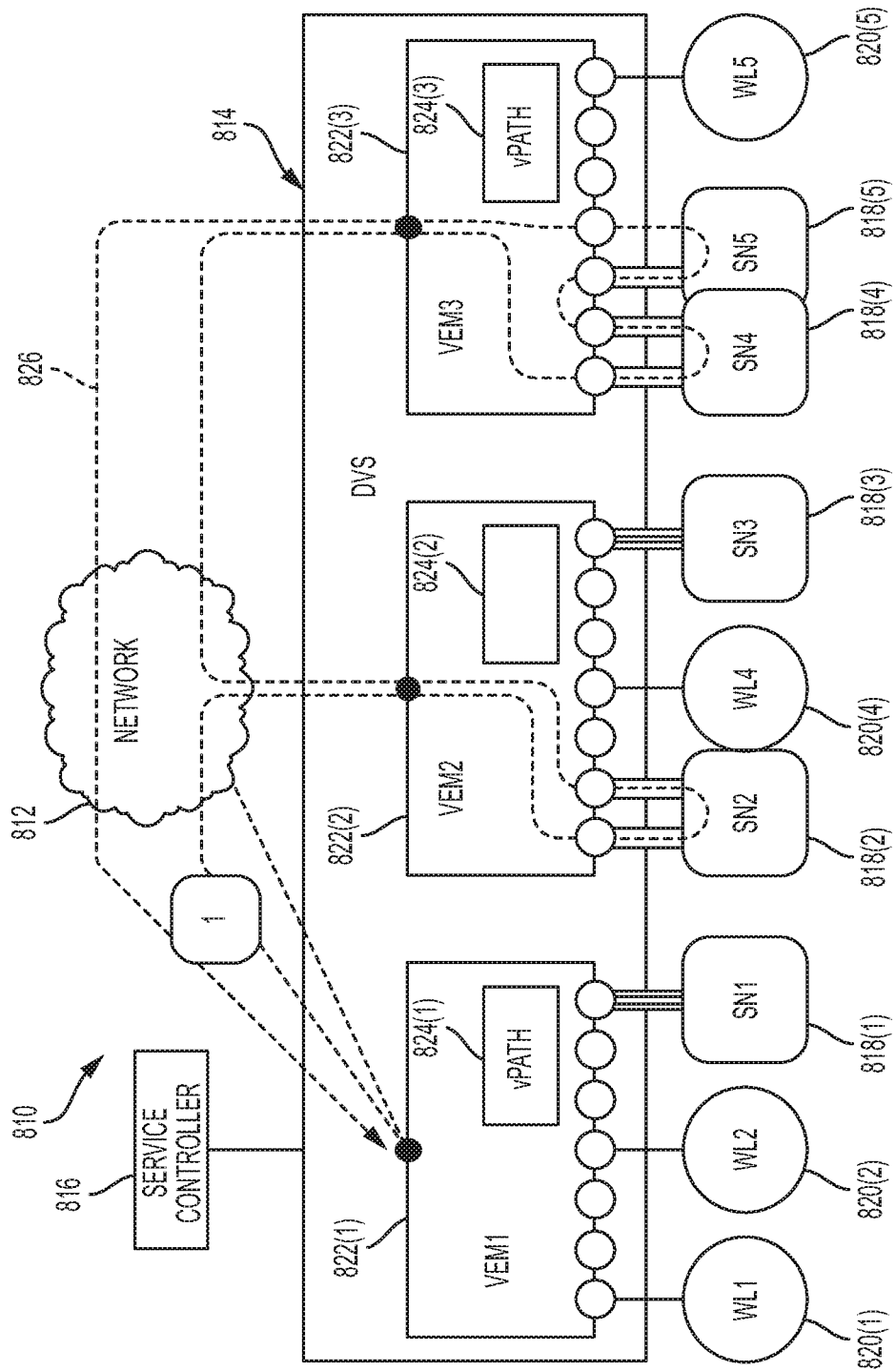
FIGS. 8A and 8B are block diagrams of a service forwarding method according to one or more examples of embodiments described herein.

FIG. 8A is a simplified block diagram illustrating a communication system 810 for distributed service chaining in a network environment according to one or more examples of the present Specification. FIG. 8A illustrates a network 812 comprising a distributed virtual switch (DVS) 814, which is provided as a non-limiting example of a platform for providing a service-chaining network. DVS 814 can include a service controller 816, which may be an SDN-C controller, such as the one provided by router 200 of FIG. 2, or any other suitable platform. A plurality of service nodes (SN) 818 (e.g., SNs 818(1)-818(5)) may provide various network services to packets entering or leaving network 812. A plurality of virtual machines (VMs) may provide respective workloads (WLs) 820 (e.g., WL 820(1)-820(5)) on DVS 814, for example, by generating or receiving packets through DVS 814. One or more virtual Ethernet modules (VEMs) 822 (e.g., VEMs 822(1)-822(3)) may facilitate packet forwarding by DVS 814. In various embodiments, DVS 814 may execute in one or more hypervisors in one or more servers (or other computing and networking devices) in network 812. Each hypervisor may be embedded with one or more VEMs 822 that can perform various data plane functions such as advanced networking and security, switching between directly attached virtual machines, and uplinking to the rest of the network. Each VEM 822(1)-822(3) may include respective service function paths (SFPs) 824(1)-824(3) that can redirect traffic to SNs 818 before DVS 814 sends the packets into WLs 820.

Note that although only a limited number of SNs 818, WLs 820, VEMs 822, and SFPs 824 are provided in the FIGURE for ease of illustration, any number of service nodes, workloads, VEMs and SFPs may be included in communication system 810 within the broad scope of the embodiments. Moreover, the service nodes and workloads may be distributed within network 812 in any suitable configuration, with various VEMs and SFPs to appropriately steer traffic through DVS 814.

Embodiments of communication system 810 can facilitate distributed service chaining in network 812. As used herein, the term "service chain" includes an ordered sequence of a plurality of services provided by one or more SNs (e.g., applications, virtual machines, network appliances, and other network elements that are configured to provide one or more network services) in the network. A "service" may include a feature that performs packet manipulations over and beyond conventional packet forwarding. Examples of services include encryption, decryption, intrusion management, firewall, load balancing, wide area network (WAN) bandwidth optimization, application acceleration, network based application recognition (N BAR), cloud services routing (CSR), virtual interfaces (VIPs), security gateway (SG), network analysis, deep packet inspection (DPI), and data and accounting services, by way of non-limiting example. The service may be considered an optional function performed in a network that provides connectivity to a network user. The same service may be provided by one or more SNs within the network.

According to some embodiments, a user (e.g., network administrator) can configure the service chain and provision it directly at an applicable workload 820 (e.g., WL 820(1)). In some cases, this may include identifying and configuring non-reactive service functions (NRSFs).

Service controller 816 may segment the user configured service chain in DVS 814. According to various embodiments, VEMs 822(1)-822(3) may generate headers for forwarding packets according to the configured service chain such that substantially all services in the service chain may be provided in a single service loop irrespective of the number of services, with respective VEMs 822(1)-822(3) making independent decisions (e.g., without referring to other VEMs or other network elements) about the next hop decisions in the service chain packet forwarding. As used herein, the term "service loop" refers to a path of the packet from a starting point (e.g., WL 820(1)) through various service nodes (e.g., SN 818(2), SN 818(4), SN 818(5)) of the service chain until termination at the starting point (e.g., WL 820(1)). The service chain traffic may be steered over network 812 in a service overlay 826. Note that it is not always necessary to terminate the starting point, so that this may not necessarily be a "loop." It is intended for "service loop" to encompass the operation in either case.

As used herein, the term "service controller" includes an engine that can provision services at one or more service nodes according to preconfigured settings. The preconfigured settings may be provided at the service controller by a user through an appropriate command line interface, graphical user interface, script, or other suitable means. The term "VEM" includes one or more network interfaces, at least some portions of switching hardware and associated firmware and software, and one or more processes managing the one or more network interfaces to facilitate packet switching in a switch, including a distributed virtual switch (e.g., DVS 814). VEMs may be named as service VEMs when they provide connectivity to service nodes, and as classifier VEMs when they provide connectivity to the workloads that function as the initial node in a service chain. In certain embodiments, one or more VEMs may be provided in an instance of a Cisco® unified computing system (UCS) rack server.

Service overlay 826 encompasses a level of indirection, or virtualization, allowing a packet (e.g., unit of data communicated in the network) destined to a specific workload to be diverted transparently (e.g., without intervention or knowledge of the workloads) to other service nodes as appropriate. Service overlay 826 includes a logical network built on top of existing network 812 (the underlay). Packets are encapsulated or tunneled to create the overlay network topology. For example, service overlay 826 can include a suitable header (e.g., a network service header ("NSH")), with corresponding source and destination addresses relevant to the service nodes in the service chain.

For purposes of illustrating the techniques of communication system 810, it is important to understand the communications that may be traversing the system. The following foundational information may be viewed as a basis from which the present disclosure may be properly explained. Such information is offered earnestly for purposes of explanation only and, accordingly, should not be construed in any way to limit the broad scope of the present disclosure and its potential applications.

Service chaining involves steering traffic through multiple services in a specific order. The traffic may be steered through an overlay network, including an encapsulation of the packet to forward it to appropriate service nodes.

Service chains are orchestrated in a centralized fashion in the network infrastructure. Each VEM 822(1)-822(3) may serve as an originator of respective network service headers (NSHs) for service overlay 826. As used herein, the term "network service header" includes a data plane header (e.g., metadata) added to frames/packets (see, e.g., FIG. 3). The NSH contains information required for service chaining, and metadata added and consumed by SNs 818 and WLs 820. (Examples of metadata include classification information used for policy enforcement and network context for forwarding post service delivery). According to embodiments of communication system 810, each NSH may include a service path identifier identifying the service chain to which a packet belongs, and a location of the packet on the service chain, which can indicate the service hop (NSH aware node to forward the packet) on service overlay 826. The service path identifier and the location of the packet can comprise any suitable text, number or combination thereof. In an embodiment, the service path identifier is a 24-bit number, and the location may be specified by an 8-bit number. In appropriate circumstances, service chains may include both agentful and agentless nodes.

According to various embodiments, a user may configure (e.g., provision, arrange, organize, construct, etc.) the service chains at service controller 816. Service controller 816 may discover the location of service nodes 818(1)-818(5). In some embodiments, the service chain may be provisioned by service controller 816 in a port profile at respective SFPs 824(1)-824(3) associated with specific workloads 820 that instantiate the service chains, thereby binding the service policy including the service chain with the network policy included in the port profile. In other embodiments, when service chains are instantiated at classifier VEM 822(1), associated with the initiating workload 820(2), service controller 816 may be notified of the service chain instantiation. Service controller 816 may assign a path identifier to each instantiated service chain. Service controller 816 may populate service forwarding table entries indicating the next service hop for respective service chains identified by corresponding path identifiers. Service controller 816 may program service-forwarding tables at appropriate VEMs 822 based on service node discovery information.

Merely for illustrative purposes, and not as a limitation, assume a service chain 1 provisioned at WL 820(2) as follows: WL2→SN2→SN4→SN5. In other words, a packet originating at WL 820(2) may be steered to SN 818(2), serviced accordingly, then to SN 818(4), then to SN 818(5), and finally returned to WL 820(2). VEM 822(1) may generate an NSH including the Internet Protocol (IP) or Media Access Control (MAC) address of VEM 822(1) at which WL 820(2) is located as a source address, and an IP/MAC address of SN 818(2) as the next service hop. Destination VEM 822(2), at which SN 818(2) is located may inspect the NSH and take suitable actions.

According to various embodiments, after the packet is suitably serviced at SN 818(2), VEM 822(2) may intercept the packet and lookup the next service hop. The NSH may be updated to indicate the next service hop as SN 818(4) (rather than WL 820(2), for example). The packet may be forwarded on service overlay 826 to the next service hop, where VEM 822(3) may intercept the packet, and proceed appropriately.

Embodiments of communication system 810 may decentralize the service forwarding decisions, with each VEM 822 making appropriate next service hop decisions. Any kind of network (e.g., enterprise, service provider, etc.) may implement embodiments of communication system 810 as appropriate.

Further, the service forwarding decision at any of VEMs 822(1)-822(3) may be limited to the next-hop of the service chain, rather than all hops of the service chain. For example, the next service hop decision at the classifier VEM (e.g., VEM 822(1)) may determine the first SN (e.g., SN 818(2)) in the service chain and may send the traffic on service overlay 826 to the first SN (e.g., SN 818(2)). The NSH may be written to indicate the source as VEM 822(1) and next service hop as SN 818(2): <overlay: source=VEM1>, destination=SN2>. The service VEM (e.g., VEM 822(2)) at SN 818(2) may simply allow the traffic on service overlay 826 to pass through to SN 818(2).

After the service is delivered at the SN (e.g., SN 818(2)), the SN (e.g., SN 818(2)) may simply send the serviced traffic back on service overlay 826 to where traffic came from (e.g., WL 820(2), or VEM 822(1)). For example, SN 818(2) may write the NSH to indicate the source as SN 818(2) and destination as VEM 822(1): <overlay: source=SN2, destination=VEM1>. The return traffic may be intercepted by the service VEM (e.g., VEM 822(2)) next (or closest) to the SN (e.g., SN 818(2)). The intercepting service VEM (e.g., VEM 822(2)) may make the service forwarding decision, determining the next SN (e.g., SN 818(4)) in the service chain and re-originating the NSH to the next SN (e.g., SN 818(4)). The NSH may be rewritten to indicate the source as VEM 822(2) and destination as SN 818(4): <overlay: source=VEM2, destination=SN4>.

The process of service forwarding can continue from VEMs 822 to SNs 818 until all SNs in the service chain deliver services. The forwarding decision may be based on the presence or absence of an agent at SN 818. For example, assume that SN 818(4) is agentless, VEM 822(3) may notice that NSH indicates a destination of SN 818(4), which is agentless. VEM 822(3) may terminate service overlay 826 and perform translation to send the traffic to SN 818(4). After SN 818(4) delivers the service, it may simply send the original payload packet out, which may be received by VEM 822(3) for translation back onto service overlay 826. VEM 822(3) may intercept SN 818(4)'s traffic and determine the next service hop as SN 818(5) (which, for example purposes, may be agentful and on the same VEM as SN 818(4)). VEM 822(3) may re-originate NSH to SN 818(5): <overlay: source=VEM3, destination=SN5>. After the service is applied, SN 818(5) may simply re-originate the NSH back to VEM 822(3): <overlay: source=SN5, destination=VEM3>.

The service VEM (e.g., VEM 822(3)) intercepting the return traffic from the last SN (e.g., SN 818(5)) in the service chain may determine the end of service chain. If the last VEM (e.g., VEM 822(3)) is capable of forwarding the payload traffic, it may simply forward it on the underlay network (e.g., network 812). If on the other hand, the payload traffic can only be forwarded by classifier VEM (e.g., VEM 822(1)), the NSH may be re-originated by the last VEM (e.g., VEM 822(3)) back to the classifier VEM (e.g., VEM 822(1)). VEM 822(1) may receive the serviced packet on service overlay 826 and may determine that all services on the service chain are delivered. VEM 822(1) may forward the original payload packet, serviced by the service chain, natively or on the underlay network (e.g., network 812), as appropriate.

In some embodiments, for example, as in a service provider network environment that represents a non-homogeneous environment, the network infrastructure, including DVS 814 may be owned and operated by the provider; WLs 820 may belong to the tenants of the provider; and SNs 818 may be hosted by the provider on behalf of the tenant or hosted by the tenants themselves, or by other third parties. In some embodiments, for example, wherein the service provider hosts SNs 818 on behalf of the tenant, NSH of service overlay 826 may use the IP/MAC addresses of VEMs 822 and SNs 818 for source and destination addresses.

Within the infrastructure of communication system 810, the network topology can include any number of servers, virtual machines, switches (including distributed virtual switches), routers, and other nodes inter-connected to form a large and complex network.

VEMs 820 can include virtual interfaces (e.g., virtual equivalent of physical network access ports) that maintain network configuration attributes, security, and statistics across mobility events, and may be dynamically provisioned within virtualized networks based on network policies stored in DVS 814 as a result of VM provisioning operations by a hypervisor management layer. VEMs 822 may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with DPs 824(2)-824(6), transparent mobility of VMs across different physical servers and different physical access-layer switches within an enterprise network may be possible. SFPs 824(1)-824(3) may provide intelligent traffic steering (e.g., flow classification and redirection), and fast path offload for policy enforcement of flows. SFPs 824(1)-824(3) may be configured for multi-tenancy, providing traffic steering and fast path offload on a per-tenant basis. Although only three SFPs 824(1)-824(3) are illustrated in FIG. 8A, any number of SFPs may be provided within the broad scope of the embodiments of communication system 810.

Figure 8B:
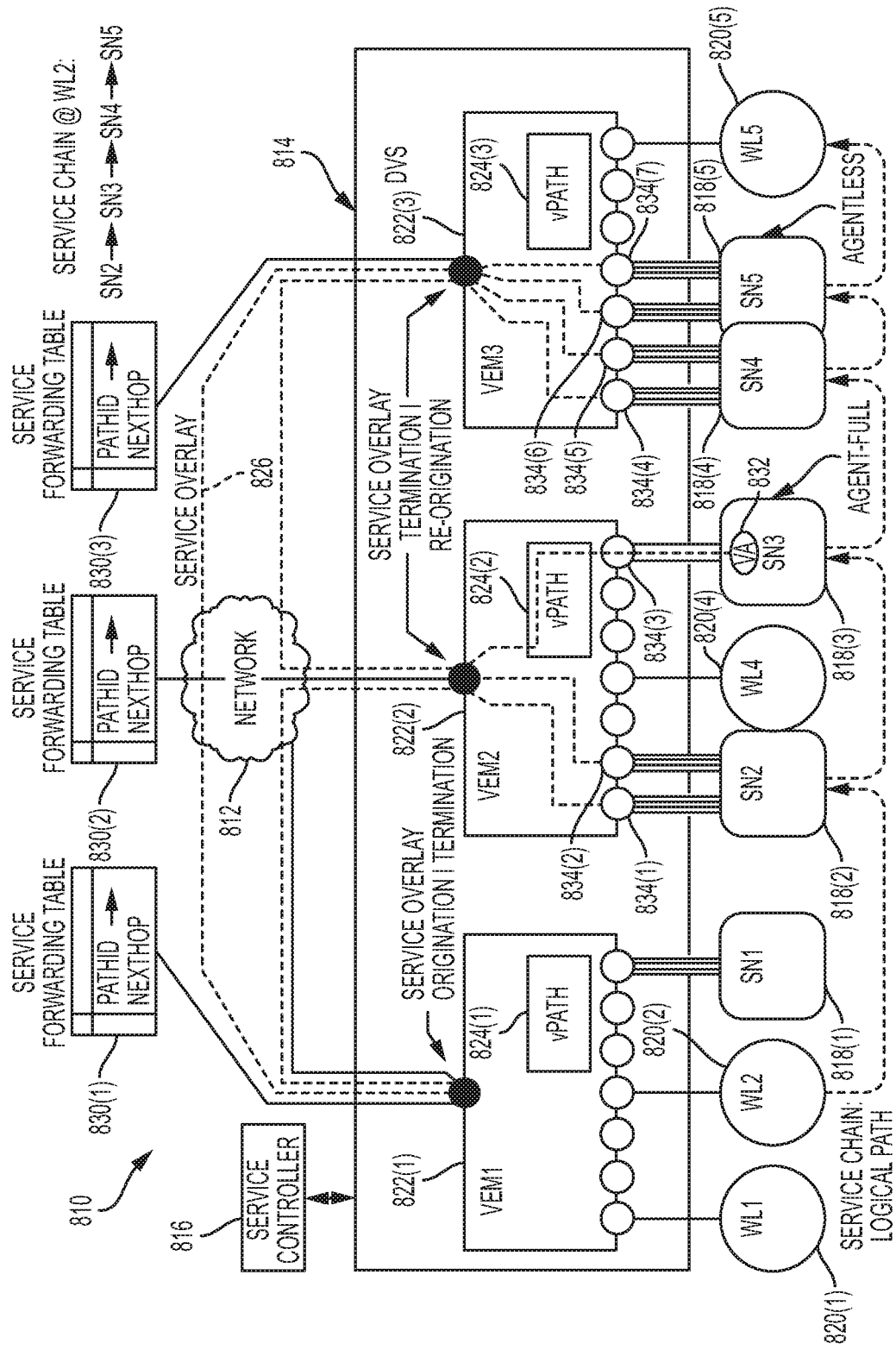

FIG. 8B is a simplified block diagram illustrating example details that may be associated with an embodiment of communication system 810. An example service chain is illustrated in the figure, starting at WL 820(2), proceeding to SN 818(2), then to SN 818(3), then to SN 818(4), then to SN 818(5), and lastly, to WL 820(5): WL2→SN2→SN3→SN4→SN5→WL5. Service controller 816 may program service forwarding tables 830(1)-830(3) at respective VEMs 822(1)-822(3). Each service forwarding table 830(1)-830(3) may include an SPI and an SIF. Some SNs 818 may include an agent 832. Note that the configuration described herein is merely for example purposes, and is not intended to be a limitation of embodiments of communication system 810.

The packet from WL 820(2) may be encapsulated with the NSH at classifier VEM 822(1) based on information in service forwarding table 830(1). The packet may be forwarded on service overlay 826 to the next service hop, namely SN 818(2). VEM 822(2) may decapsulate the NSH, and forward the packet through interface 834(1) to SN 818(2). SN 818(2) may service the packet, and rewrite the packet header to indicate the destination address of VEM 822(1) and send the packet out through interface 834(2). VEM 822(2) may intercept the packet, and re-originate the NSH based on information in service forwarding table 830(2). The destination may be written to be the IP/MAC address of SN 818(3). After being serviced, the packet may be returned to VEM 822(2) via interface 834(3). VEM 822(2) may intercept the packet, and re-originate the NSH based on information in service forwarding table 830(2). The destination may be written to be the IP/MAC address of SN 818(4) and the packet forwarded to VEM 822(3) on service overlay 826.

VEM 822(3) may decapsulate the packet, and forward the packet to SN 818(4) over interface 834(4). SN 818(4) may service the packet appropriately, and attempt to return it to VEM 822(1) over interface 834(5). VEM 822(3) may intercept the packet, and re-originate the NSH based on information in service forwarding table 830(3). The destination may be written to be the IP/MAC address of SN 818(5) and the packet forwarded to SN 818(5) over interface 834(6). SN 818(5) may service the packet appropriately, and attempt to return it to VEM 822(1) over interface 834(7). VEM 822(3) may intercept the packet, and re-originate the NSH based on information in service forwarding table 830(3). In some embodiments, the destination may be written to be the IP/MAC address of WL 820(5) and the packet forwarded to WL 820(5) over network 812, or the appropriate interface. In other embodiments, the destination may be written to be the IP/MAC address of classifier VEM 822(1) and the packet forwarded to WL 820(2) on service overlay 826 as appropriate.

Figure 9A:
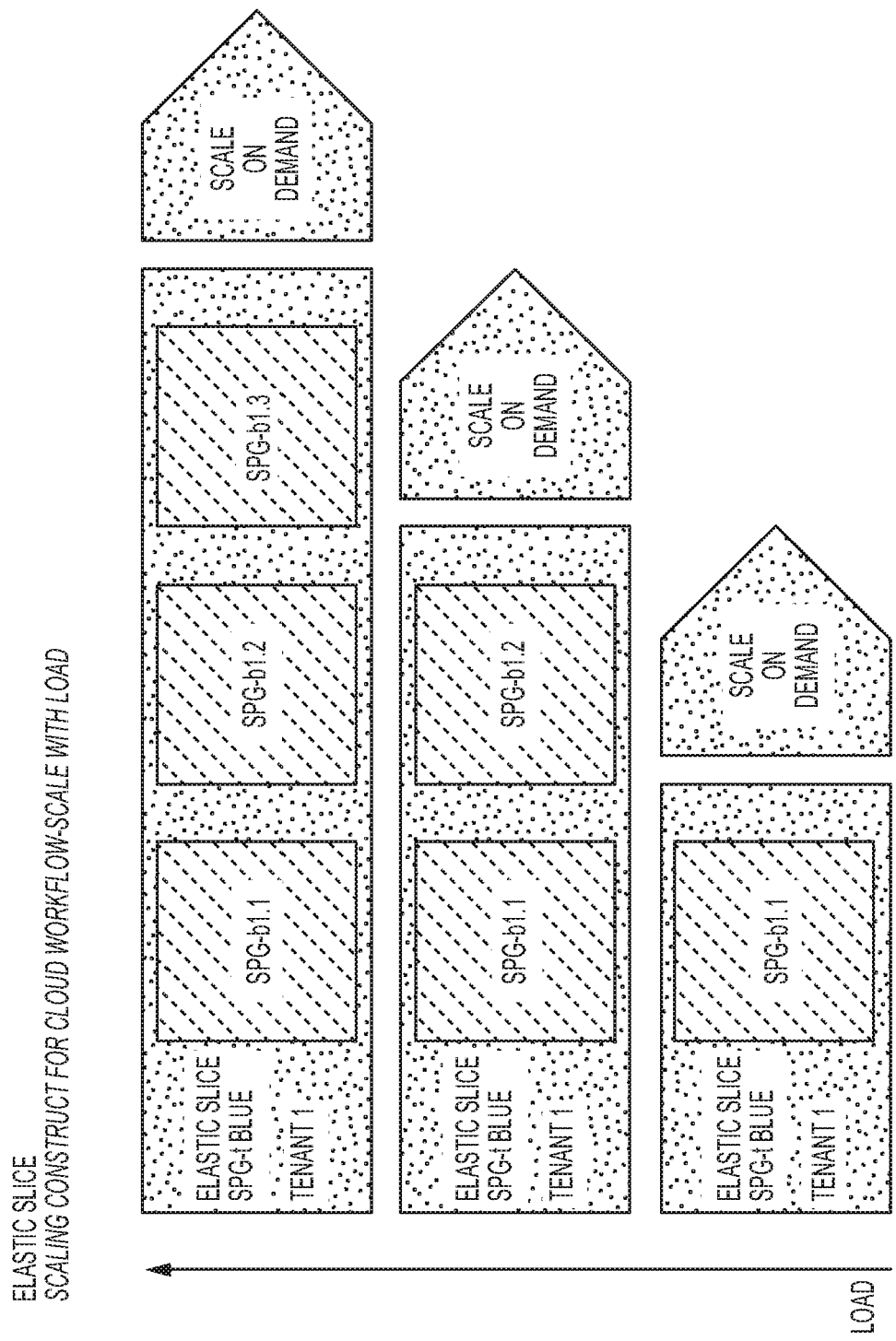
FIGS. 9A-9C illustrate the concept of an elastic slice according to one or more examples of embodiments described herein.
Figure 9B:
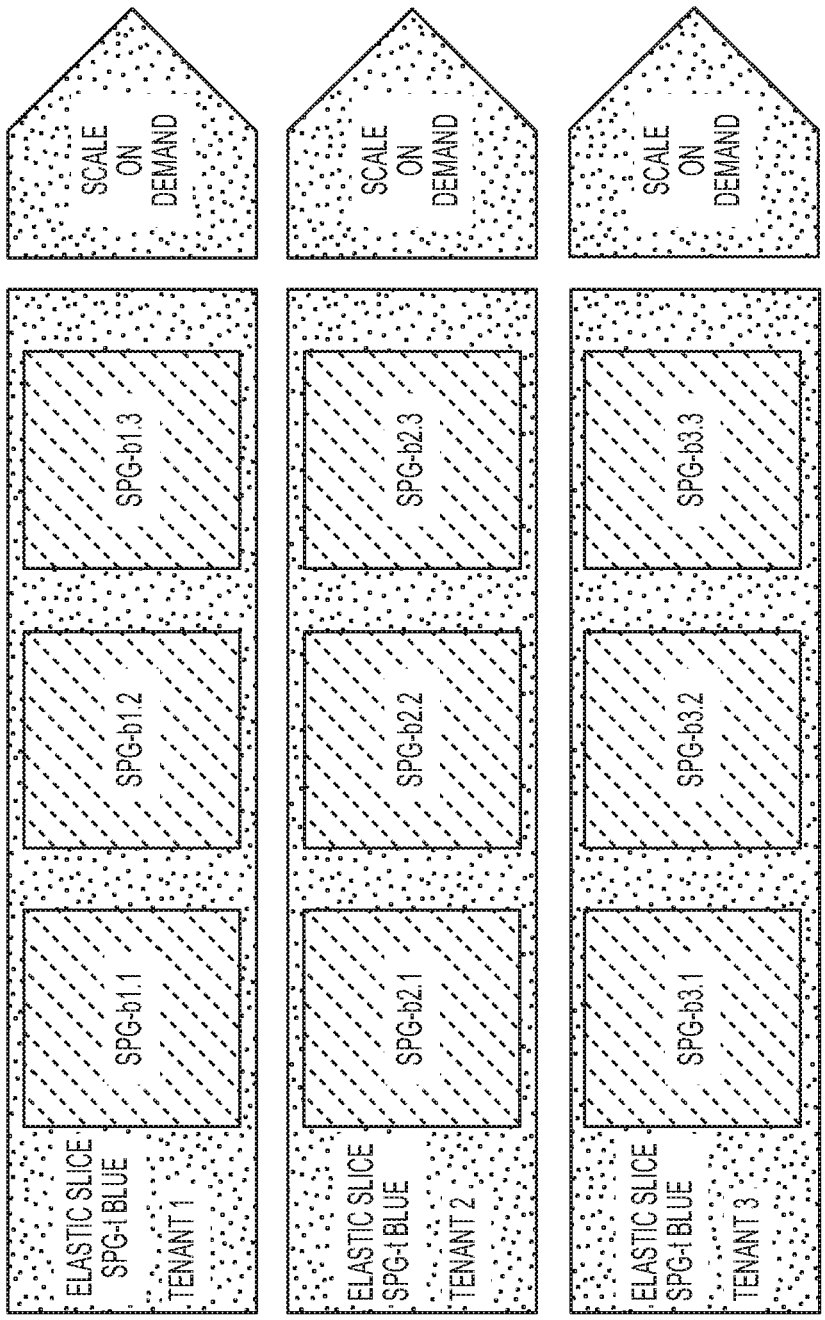
Figure 9C:
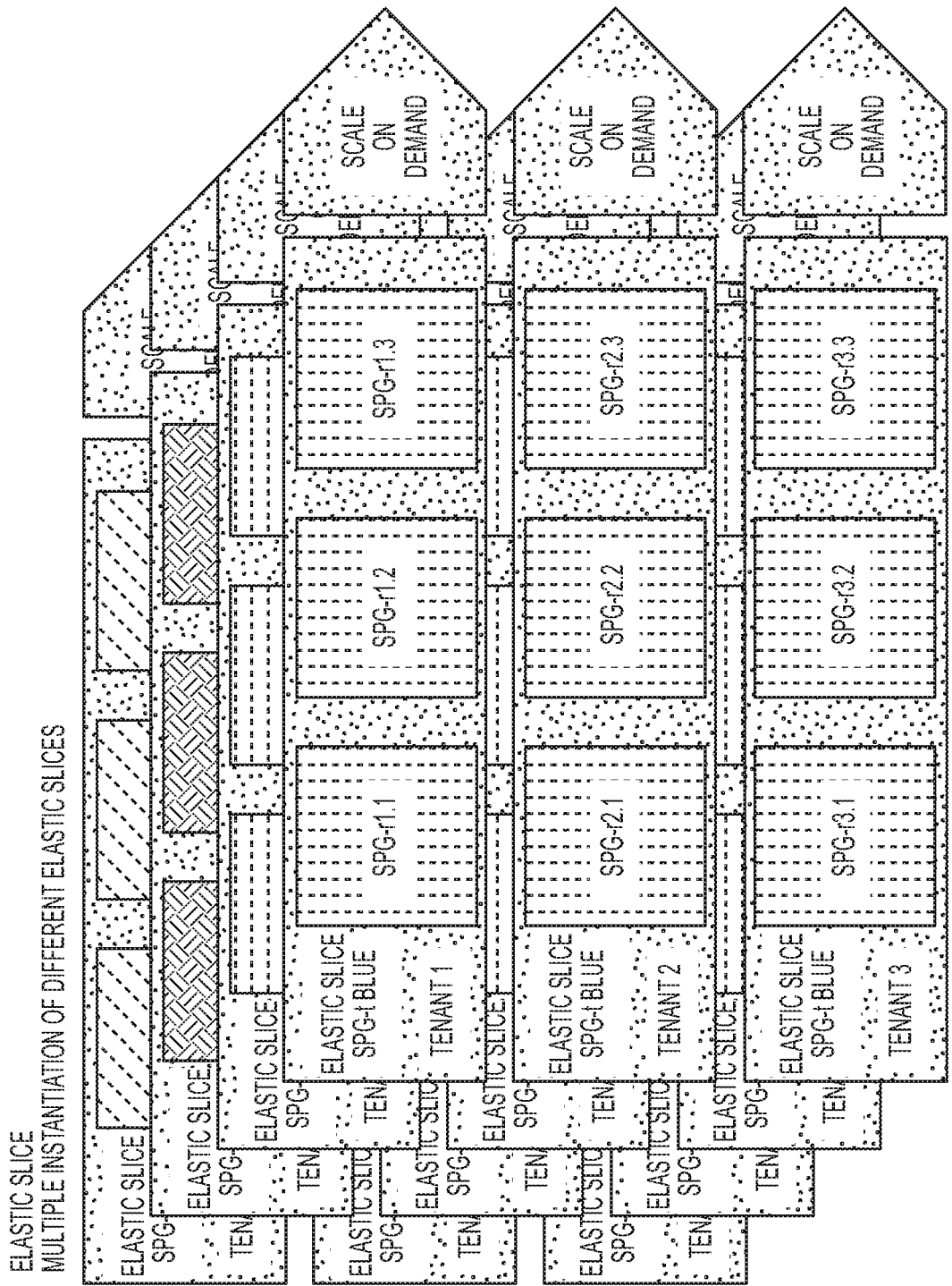

In accordance with features of embodiments described herein, a new construct referred to as a Service Path Group Template ("SPGT") is defined and is used to instantiate Service Path Groups ("SPGs"), or "slices." As described herein, slices are the foundational units on which all operations are performed. For instance, slices may be expanded or contracted by adding or removing SPGs, respectively, hence becoming elastic slices. Slices can also be scaled to replace a failed SPG thus providing high availability. For example, a SPGT designated SPGT-X may be instantiated into two SPGs, respectively designated SPGT-Xa and SPGT-Xb. Additionally, SPG-Xa may be scaled up two times by adding two more SPGs designated SPG-Xa1 and SPG-Xa2 to the original SPG SPG-Xa. The elasticity of slices is illustrated in FIGS. 9A-9C, which respectively illustrate scaling with load by adding (or removing) SPGs (FIG. 9A), multiple instantiation of the same SPG (FIG. 9B), and multiple instantiation of different SPGs (FIG. 9C).

An SPGT may be instantiated into as many elastic slices as are necessary. Each slice can then be scaled up and eventually shrunk. For instance an SPGT can be instantiated twice to create elastic slices for two different departments or two tenants. Each slice can then be scaled up by adding additional SPGs as the load increases in the corresponding department or tenant and subsequently scaled down by removing SPGs as the load in the corresponding department or tenant decreases.

Figure 10:
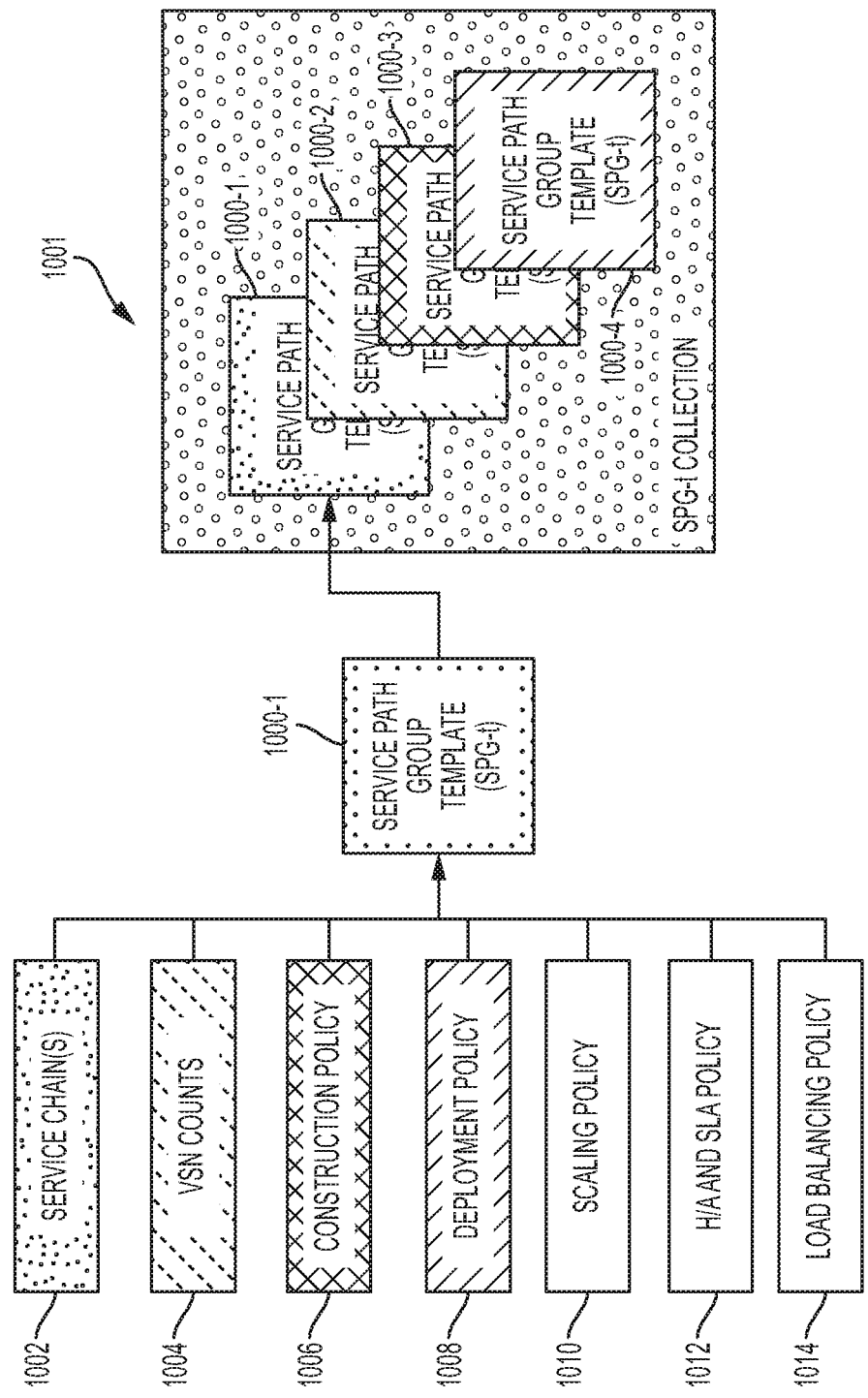
FIG. 10 illustrates creation of an SPGT collection according to one or more examples of embodiments described herein.

Referring now to FIG. 10, in one embodiment, each SPGT 1000 of a collection of SPGTs 1001 may include a definition of SCs 1002, SF profiles and instance counts (or "VSN counts") 1004, construction policy 1006, deployment policy 1008, scaling policy 1010, HA and SLA policy 1012, and load balancing policy 1014 to be implemented by the SPG instances. SPGT serves as the basic input provided, in a declarative fashion, by the operator in starting the service deployment process. The service chain definition 1002 indicates one or more service chains in which each service chain is an ordered list of service function types. The defined service chains are the service chains used to construct the service paths within the SPG. Also included in the definition of service chains are the policies for classifying traffic to the particular service chain, which policies are described in IETF SFC. The policies are executed as part of the classifier function to select the service chain and its service path. The SF profile and instance (or "VSN") counts 1004 are the actual profile or a reference to it. The profile contains SF image location URL, SF capacity specification, resource requirements, IETF SFC NSH awareness, etc. The SF profile indicates SF Capacity, which is the capacity of the SF in normalized or actual units. For instance, a firewall or a NAT is specified by the vendor to deliver a certain throughput (throughput as unit), while a compute intensive SF such as DPI may be specified to consume a certain number of CPU cycles to perform its function (CPU cycles as unit). These specifications can be provided by the operators as normalized units when different types of metrics (e.g., CPU cycles and throughput) are involved among the different SFs in a chain. In normalizing, the operator determines manually, how each normalized unit equates to a specific type of unit. These specifications can also be actual units as opposed to normalized units, when all of the SFs in a chain involve the same type of metric. SF instance counts indicate the number of instances of each defined SF the operator would like to include in the SPGT. The instance count may correspond to a subset of instance licenses held by the operator for each type of SF.

The construction policy 1006 dictates whether each of the service functions should be independent or shared among different service paths constructed from service chains 1002. The construction policy 1006 may further dictate an algorithm, such as round-robin, to be used in rendering the service paths. Some possibilities for sharing include "Exclusive", in which case there is no sharing of SFs between the chains specified in the template; "Throughput," in which case the SFs are shared among the service paths in the SPGs until the throughput specification of the shared SFs are exhausted; and "Normalized," in which the SFs are shared among the service chain instances in the SPG template until the normalized units of the shared SFs are exhausted.

Deployment policy 1008 indicates how the rendered service paths are to be deployed. More specifically, deployment policy 1008 indicates affinity and dependency requirements for the SFs; for example, whether the SFs in the service chains need to be on the same or different hosts and/or same or different networks, etc. Scaling policy 1010 indicates when to scale up or down the SPG. In the simplest case, scaling policy can be related to an aggregate threshold of Key Performance Indicators ("KPIs") across the SPG. In more advanced cases, scaling policy may include a series of thresholds against each type of SF. When a threshold is exceeded, the scale event is automatically triggered. In more conventional cases, the operator may watch the operational state of the SPGs and manually trigger the scaling. H/A and SLA policy 1012 indicates the service level that should be provided by the slice. This policy is provided to the underlying infrastructure if it supports such specifications. In other cases, where the infrastructure only supports monitoring, the SLA policy is enforced as part of the system-management plane and can trigger scaling (in addition to or overriding KPIs) if monitoring detects conditions that violate the SLA provided.

Figure 11A:
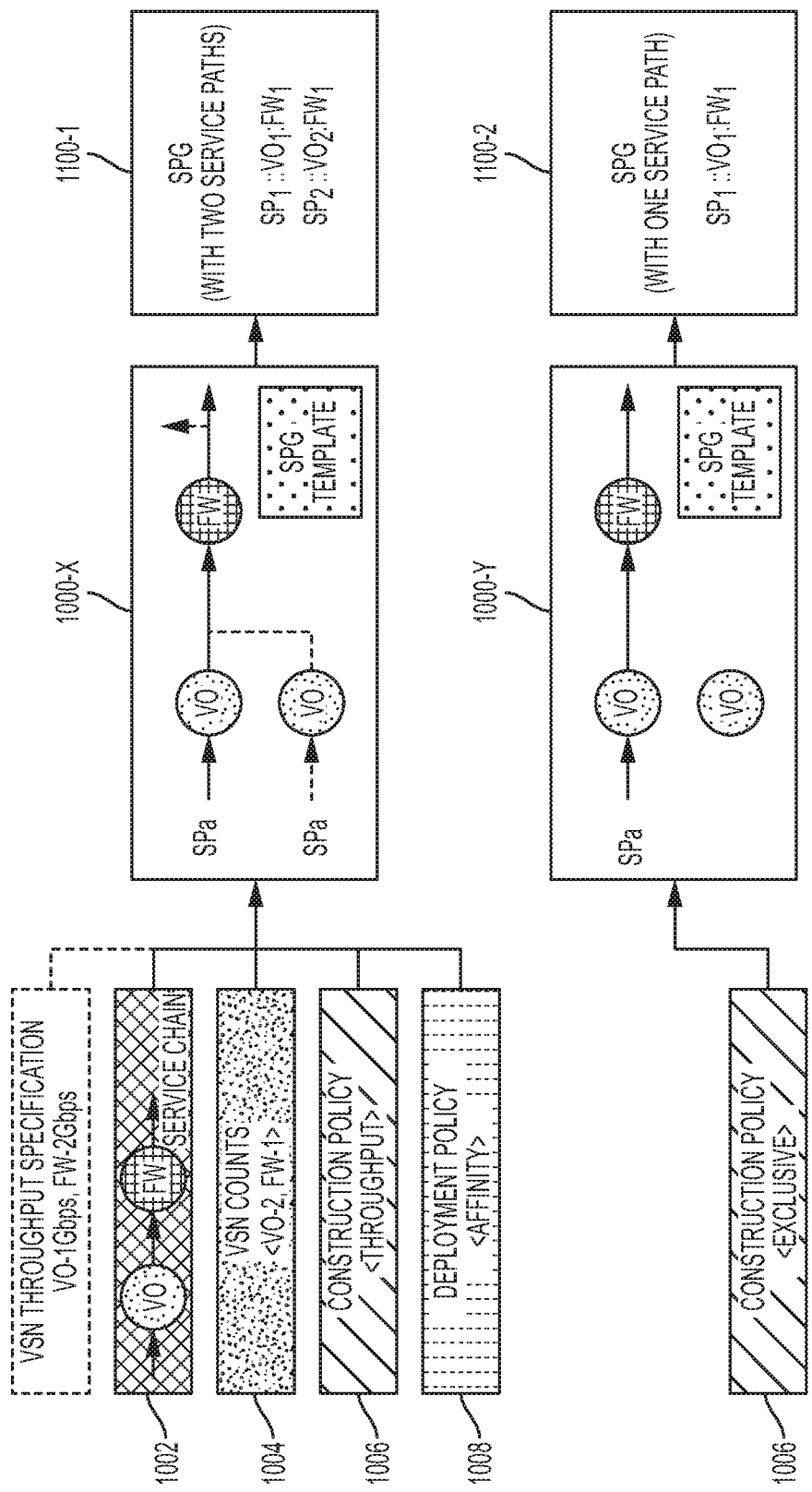
FIGS. 11A and 11B illustrate creation of SPG instances from an SPGT according to one or more examples of embodiments described herein.
Figure 11B:
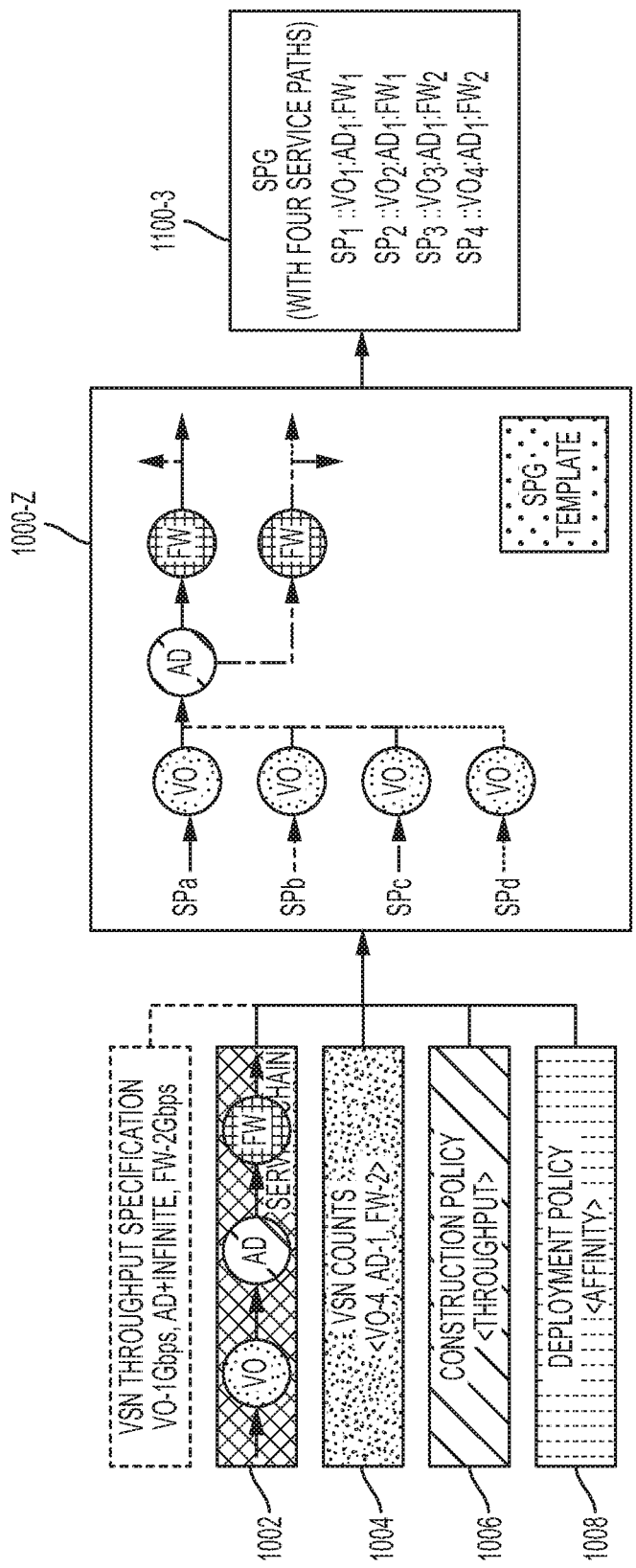

Load balancing policy 1014 indicates how service paths are selected among instances of SPG or how SPGs themselves are selected to provide load balancing across the slices. SFC classification selects the service chain according to policy specified in the service chain definition. For example, policies could be, but are not limited to, round-robin or least-loaded. Implementation of the various policies 1002-1008 set forth in an SPGT 1000 to create SPG instances 1100 is illustrated with two examples (and a subset of policies) in FIGS. 11A and 11B.

Figure 12:
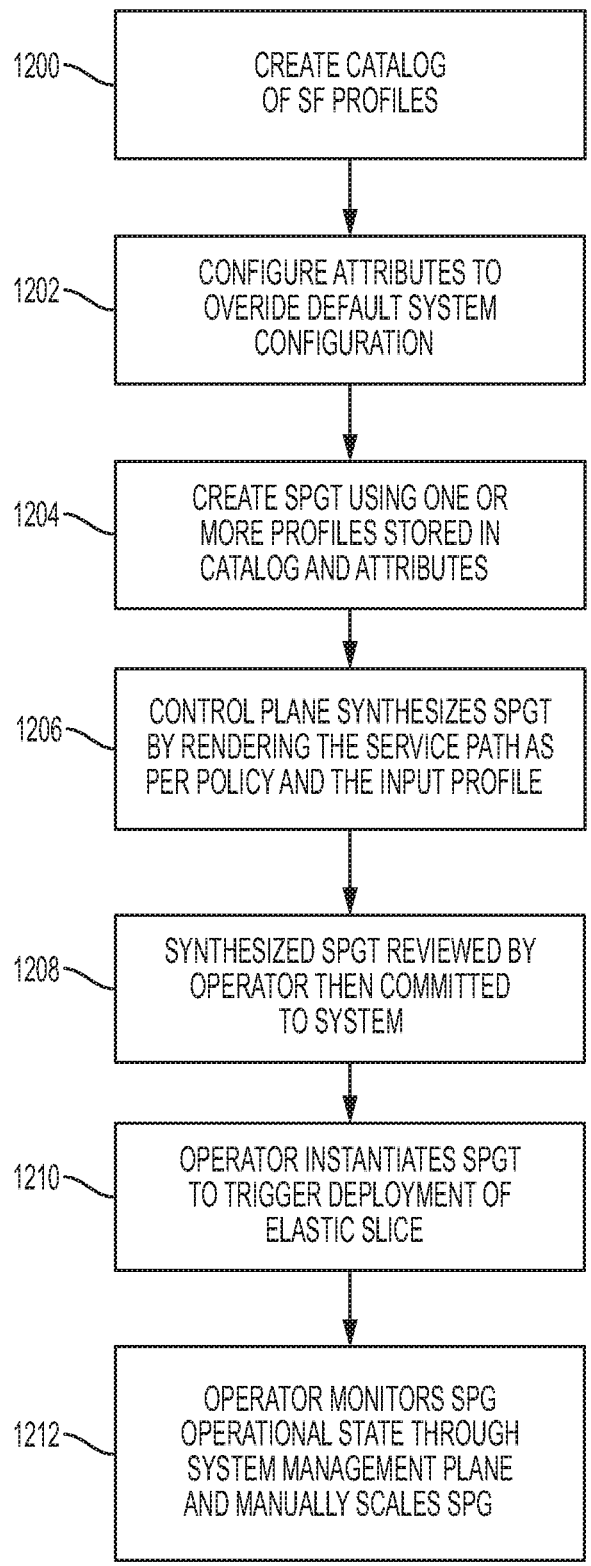
FIG. 12 is a flowchart of a method that may be performed according to one or more examples of embodiments described herein.

FIG. 12 is a flowchart illustrating operations performed in one embodiment for deploying and managing SPGs and their service paths. In step 1200, a catalog containing the various SF profiles is created. In certain embodiments, the catalog is stored in a database or memory device associated with the service controller. The input may come from a Graphical User Interface ("GUI"), which programs the service controller (through RESTful interface, for example) or directly into the service controller through a command line interface ("CLI") provided by the service controller. Once created, a catalog will be available in the service controller or the GUI for the user to select from.

In step 1202, the necessary attributes are configured to override any default system configuration. For example, the system, or in this specific case, a service controller responsible for controlling and managing the entire system, has numerous default parameters with which it is deployed. For many deployments the default parameters are sufficient but there are always operators who have a special need or variance in environment, which requires over-riding the default parameters. For instance, a pre-defined set of networks with a specific range of network addresses are set as default. For normal deployments, this should suffice. But the operator may choose to configure a different set of network addresses are different networks. The operator may do this because the infrastructure may already be using either the addresses or the networks and hence a conflict exists.

In step 1204, an SPGT with all of the input described above is created. In step 1206, the system control plane synthesizes the SPGT by rendering the services paths as per policy and the input, or SF, profile, which describes the SF in terms of number of interfaces, encapsulation used, L2/L3 mode of interaction, type of service, etc. Synthesizing involves, taking the input (1002-1006) of SPGT and actually creating as many template service paths as possible while conforming to the policy. The template service paths are eventually (as part of deployment) assigned actual identifiers or SPIs. SPIs are the basis for forwarding packets on, as described earlier, for SFC. This further involves ensuring the SF instances are shared among the different SPIs according to policy. When shared, the synthesizing algorithm ensuring that the capacity metrics of each SF (whether normalized or specific units) are considered, balanced and not over-committed, etc. At the end of synthesizing or rendering phase, the data and policies in 1002-1006, which are declarative, are turned into an actual representation showing how the SFs are connected to each other, within a SPG. As a next step, deployment policy 1008 turns this transient rendered state into reality by actually instantiating virtual machines or containers hosting the SF. In summary, synthesizing involves taking the SPG-t and providing a depiction of the SPG before the SPG is actually realized, which happens via deployment policy.

In step 1208, the synthesized SPGT is viewed by the operator (e.g., via the GUI or CLI) before it is committed to the system. The operator is essentially checking to make sure the intent, as described via the profiles and policies in SPGT, are actually translated into a satisfactory rendering. This is analogous to making a cookie-cutter tray, before actually creating the cookies from that tray. The policies are describing the intent of how the cookie cutter tray should look like, without actually explicitly describing the cookie-cutter tray. If the operator is not satisfied with the rendered SPG, the operator goes back tweaks the intent or the policies to achieve the desired effect in rendering.

In step 1210, the operator instantiates the SPGT, which triggers the actual deployment of an elastic slice with an ID or name associated with it. Deployment of the slice further involves instantiation of the SFs through virtual infrastructure manager interaction. This may lead to resource reservation in the infrastructure, actual instantiation of each SF VM, and lifecycle management apart from KPI monitoring and reporting. The control and management planes of the system maintain the operational state of the SPGs. In step 1212, the operator monitors the SPG operational state through the system management plane and manually performs scale up/down operations or the SPGT policies (scaling, SLA and H/A) automatically kick in at appropriate times to perform the equivalent based on the operational state and KPIs.

In general, the steps illustrated in FIG. 12 may be realized by a set of control and management entities. In the simplest case, it will be assumed that there are three such entities, including a service controller responsible for all the control actions leading to changes in the system, a management entity responsible for monitoring the system and providing status and visibility into it, and an SLA entity responsible for collecting data from the management entity or the system directly and analyzing it to ensure SLAs are met. If SLAs are not met, the SLA entity interacts with the service controller to change the system to align with the SLAs. For instance, SLA may detect that the load of single SPG has going beyond the mandated 60% of capacity and interacts with service controller to launch a new SPG-IOW, scale the elastic slice.

In a cloud deployment scenario, the SPGs instantiated or scaled may all be deployed on the same physical x86 host or may reside on different x86 hosts. Each SPG may have its service functions split across multiple hosts due to resource availability. The SPG operates consistently in all these cases with actual connectivity provided by the underlying system to all the SFs.

In certain embodiments, the system described herein is fully model driven, with SPGTs modeled using Yang data models, for example. Both ETSI NFV architectures and data center service insertion architectures can embody the embodiments described herein to simplify the operational workflow and automate the system deployment and management. Additionally, although described with reference to service function VMs, the same concepts may apply to container form factor service functions or applications. The SFC classifier performing the traffic classification to select the service chain and load balance across its instances, must also adhere to the stickiness requirements of flows with respect to SFs to ensure correct operation of the system.

Figure 13:
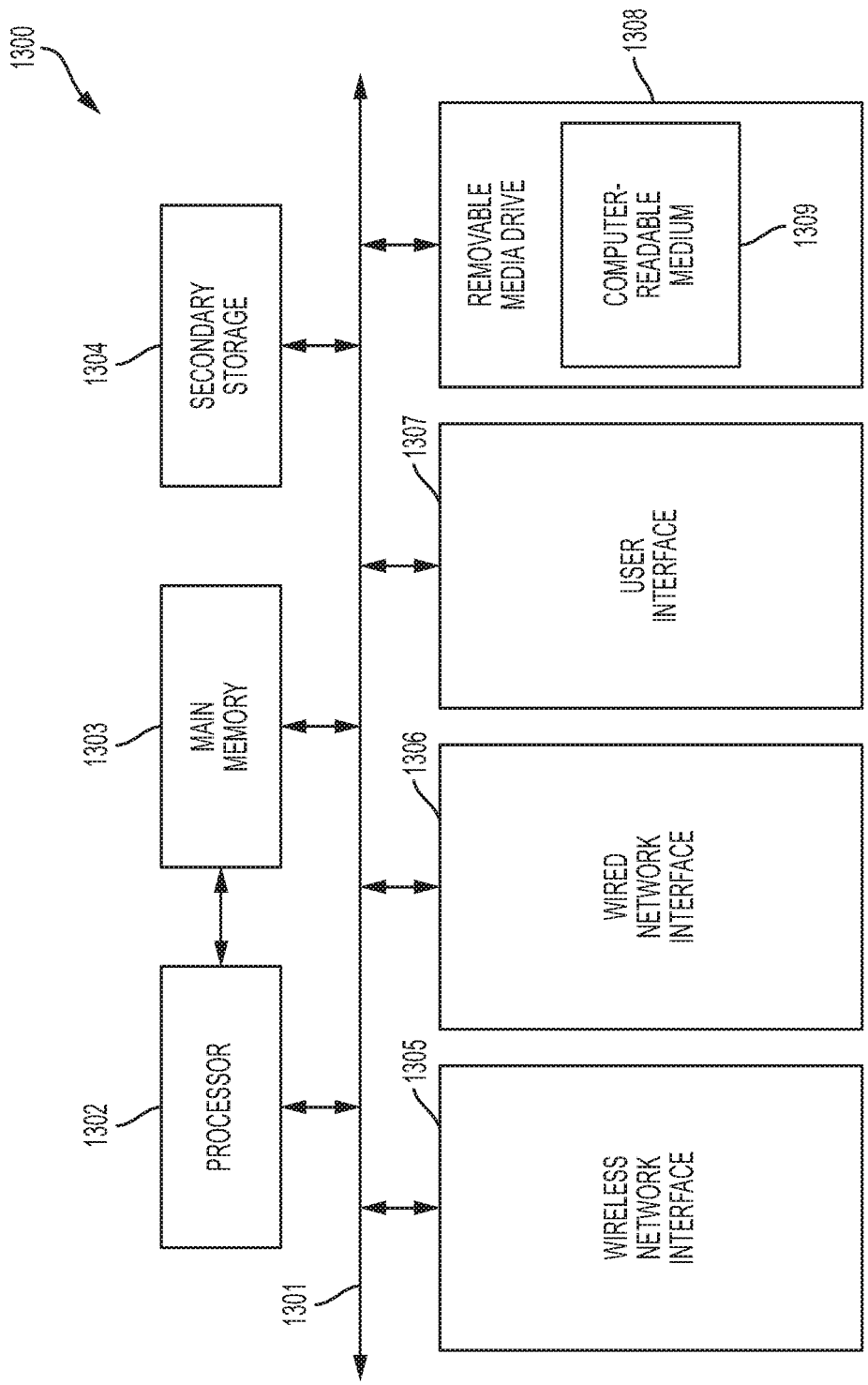
FIG. 13 is a simplified block diagram of a machine comprising an element of a communications network according to one or more examples of embodiments described herein.

Turning to FIG. 13, FIG. 13 illustrates a simplified block diagram of an example machine (or apparatus) 1300, which in certain embodiments may be a classifier or a forwarding element, that may be implemented in embodiments described herein. The example machine 1300 corresponds to network elements and computing devices that may be deployed in a communications network, such as a classifier or a forwarding element. In particular, FIG. 13 illustrates a block diagram representation of an example form of a machine within which software and hardware cause machine 1300 to perform any one or more of the activities or operations discussed herein. As shown in FIG. 13, machine 1300 may include a processor 1302, a main memory 1303, secondary storage 1304, a wireless network interface 1305, a wired network interface 1306, a user interface 1307, and a removable media drive 1308 including a computer-readable medium 1309. A bus 1301, such as a system bus and a memory bus, may provide electronic communication between processor 1302 and the memory, drives, interfaces, and other components of machine 1300.

Processor 1302, which may also be referred to as a central processing unit ("CPU"), can include any general or special-purpose processor capable of executing machine readable instructions and performing operations on data as instructed by the machine readable instructions. Main memory 1303 may be directly accessible to processor 1302 for accessing machine instructions and may be in the form of random access memory ("RAM") or any type of dynamic storage (e.g., dynamic random access memory ("DRAM")). Secondary storage 1304 can be any non-volatile memory such as a hard disk, which is capable of storing electronic data including executable software files. Externally stored electronic data may be provided to computer 1300 through one or more removable media drives 1308, which may be configured to receive any type of external media such as compact discs ("CDs"), digital video discs ("DVDs"), flash drives, external hard drives, etc.

Wireless and wired network interfaces 1305 and 1306 can be provided to enable electronic communication between machine 1300 and other machines, or nodes. In one example, wireless network interface 1305 could include a wireless network controller ("WNIC") with suitable transmitting and receiving components, such as transceivers, for wirelessly communicating within a network. Wired network interface 1306 can enable machine 1300 to physically connect to a network by a wire line such as an Ethernet cable. Both wireless and wired network interfaces 1305 and 1306 may be configured to facilitate communications using suitable communication protocols such as, for example, Internet Protocol Suite ("TCP/IP"). Machine 1300 is shown with both wireless and wired network interfaces 1305 and 1306 for illustrative purposes only. While one or more wireless and hardwire interfaces may be provided in machine 1300, or externally connected to machine 1300, only one connection option is needed to enable connection of machine 1300 to a network.

A user interface 1307 may be provided in some machines to allow a user to interact with the machine 1300. User interface 1307 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 1308 represents a drive configured to receive any type of external computer-readable media (e.g., computer-readable medium 1309). Instructions embodying the activities or functions described herein may be stored on one or more external computer-readable media. Additionally, such instructions may also, or alternatively, reside at least partially within a memory element (e.g., in main memory 1303 or cache memory of processor 1302) of machine 1300 during execution, or within a non-volatile memory element (e.g., secondary storage 1304) of machine 1300. Accordingly, other memory elements of machine 1300 also constitute computer-readable media. Thus, "computer-readable medium" is meant to include any medium that is capable of storing instructions for execution by machine 1300 that cause the machine to perform any one or more of the activities disclosed herein.

Not shown in FIG. 13 is additional hardware that may be suitably coupled to processor 1302 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 1300 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 1300 to appropriately manage the operation of the hardware components therein.

The elements, shown and/or described with reference to machine 1300, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 1303, secondary storage 1304, computer-readable medium 1309) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 1302) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Certain embodiments described herein separate the overlay in service function chaining into an infrastructure overlay and a service function overlay, allowing additional security policies to be enforced between the two. Certain embodiments described herein provide a stateless, hardware friendly method for decrementing the NSH service index without requiring any state at the forwarding element or sender awareness. Additionally, certain embodiments described herein restrict the forwarding decisions (in updating the service index) to the forwarding elements alone and frees the service functions to focus purely on service delivery and avoid dealing with complexities associated with forwarding decisions. Still further, certain embodiments described herein enable the service chaining control plane to scale independently of the number of service functions and prevent issues that may arise due to incorrect manipulation of the service index by limiting manipulation of the service index to forwarding elements.

Certain embodiments described herein allow snooping tools or any type of intermediate nodes to clearly determine whether the NSH encapsulated packet is going between forwarding elements or between a forwarding element and a service function without relying on the source and destination locators, which is useful in tracing and debugging, especially in cloud deployments. Certain embodiments described herein allow the service index on an NSH packet to be always associated with the service function as indicated by the service index whether the packet is in transit from a forwarding element to the service function or from the service function to a forwarding element.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIG- URES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for applying service functions to a traffic flow of a network, the method comprising:

creating a catalog of service function ("SF") profiles for use in a network comprising a distributed virtual switch ("DVS"), each of the profiles associated with an SF and indicates a type of the associated SF and an image location URL;

storing the catalog of SF profiles in a memory device of a service controller associated with the DVS;

configuring at least one attribute to override at least one default configuration of the service controller;

in response to configuring the at least one attribute, creating a service profile group template ("SPGT") that includes at least one SF profile from the catalog of SF profiles, the SPGT including a service chain definition identifying at least one service chain comprising the SF associated with the at least one SF profile to be executed in connection with a service path and at least one policy for classifying traffic to the at least one service chain;

in response to creating the SPGT, synthesizing the SPGT by creating possible template service paths for deploying the service chain at least in part based on the at least one SF profile and to conform with the at least one policy;

in response to synthesizing the SPGT, deploying a first service profile group ("SPG") instance of an SPG based at least in part on the service path of the possible template service paths of the SPGT, wherein the deploying includes assigning an identifier to the SPG instance and reserving resources for the SPG instance; and in response to a threshold specific to the at least one SF profile being exceeded, automatically deploying an additional SPG instance based on the SPGT in accordance with a scaling policy included in the SPGT.

2. The method of claim 1, wherein the SF profile further indicates for the associated SF capacity in normalized or actual units and resource requirements.

3. The method of claim 1, wherein the SPGT includes an indication of a number of instances of the SF to be included in the service chain.

4. The method of claim 1, wherein the SPGT includes a construction policy indicating whether an instance of the SF included in the service chain may be shared with another service chain.

5. The method of claim 1, wherein the SPGT includes a deployment policy that indicates affinity and dependency requirements for SFs comprising the service chain.

6. The method of claim 1, wherein the scaling policy indicates conditions under which to add or remove instances of the SPG.

7. The method of claim 1, wherein the SPGT includes a policy indicating a service level to be provided by the first SPG instance.

8. The method of claim 1, wherein the SPGT includes a load balancing policy indicating how service paths are selected among instances of the SPG.

9. One or more non-transitory tangible media that includes code for execution and when executed by a processor is operable to perform operations comprising:

creating a catalog of service function ("SF") profiles for use in a network comprising a distributed virtual switch ("DVS"), each of the profiles associated with an SF and indicates a type of the associated SF and an image location URL;

storing the catalog of SF profiles in a memory device of a service controller associated with the DVS;

configuring at least one attribute to override at least one default configuration of the service controller;

in response to configuring the at least one attribute, creating a service profile group template ("SPGT") that includes at least one SF profile from the catalog of SF profiles, the SPGT including a service chain definition identifying at least one service chain comprising the SF associated with the at least one SF profile to be executed in connection with a service path and at least one policy for classifying traffic to the at least one service chain;

in response to creating the SPGT, synthesizing the SPGT by creating possible template service paths for deploying the service chain at least in part based on the at least one SF profile and to conform with the at least one policy;

in response to synthesizing the SPGT, deploying a first service profile group ("SPG") instance of an SPG based at least in part on the service path of the possible template service paths of the SPGT, wherein the deploying includes assigning an identifier to the SPG instance and reserving resources for the SPG instance; and in response to a threshold specific to the at least one SF profile being exceeded, automatically deploying an additional SPG instance based on the SPGT in accordance with a scaling policy included in the SPGT.

10. The media of claim 9, wherein the SF profile further indicates for the associated SF capacity in normalized or actual units and resource requirements.

11. The media of claim 9, wherein the SPGT includes an indication of a number of instances of the SF to be included in the service chain.

12. The media of claim 9, wherein the SPGT includes a construction policy indicating whether an instance of the SF included in the service chain may be shared with another service chain.

13. The media of claim 9, wherein the SPGT includes a deployment policy that indicates affinity and dependency requirements for SFs comprising the service chain.

14. The media of claim 9, wherein the scaling policy indicates conditions under which to add or remove instances of the SPG.

15. The media of claim 9, wherein the SPGT includes a policy indicating a service level to be provided by the SPG.

16. The media of claim 9, wherein the SPGT includes a load balancing policy indicating how service paths are selected among instances of the SPG.

17. An apparatus comprising:
a memory element configured to store data; and
a processor operable to execute instructions associated with the data;
the apparatus configured for:
creating a catalog of service function ("SF") profiles for use in a network comprising a distributed virtual switch ("DVS"), each of the profiles associated with an SF and indicates a type of the associated SF and an image location URL;
storing the catalog of SF profiles in a memory device of a service controller associated with the DVS;
configuring at least one attribute to override at least one default configuration of the service controller;
in response to configuring the at least one attribute, creating a service profile group template ("SPGT") that includes at least one SF profile from the catalog of SF profiles, the SPGT including a service chain definition identifying at least one service chain comprising the SF associated with the at least one SF profile to be executed in connection with a service path and at least one policy for classifying traffic to the at least one service chain;
in response to creating the SPGT, synthesizing the SPGT by creating possible template service paths for deploying the service chain at least in part based on the at least one SF profile and to conform with the at least one policy;
in response to synthesizing the SPGT, deploying a first service profile group ("SPG") instance of an SPG based at least in part on the service path of the possible template service paths of the SPGT, wherein the deploying includes assigning an identifier to the SPG instance and reserving resources for the SPG instance; and
in response to a threshold specific to the at least one SF profile being exceeded, automatically deploying an additional SPG instance based on the SPGT in accordance with a scaling policy included in the SPGT.

18. The apparatus of claim 17, wherein the SF profile further indicates for the associated SF capacity in normalized or actual units and resource requirements.

19. The apparatus of claim 17, wherein the SPGT includes an indication of a number of instances of the SF to be included in the service chain.

20. The apparatus according to claim 17, wherein the scaling policy indicates conditions under which to add or remove instances of the SPG.

* * * * *